United States Patent
Tochio

(10) Patent No.: US 7,961,602 B2
(45) Date of Patent: Jun. 14, 2011

(54) METHOD AND DEVICE USING A BACKUP COMMUNICATION PATH TO TRANSMIT EXCESS TRAFFIC

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 11/730,127

(22) Filed: Mar. 29, 2007

(65) Prior Publication Data

US 2008/0068988 A1 Mar. 20, 2008

(30) Foreign Application Priority Data

Sep. 19, 2006 (JP) ................................. 2006-252434

(51) Int. Cl.
*H04L 1/00* (2006.01)
(52) U.S. Cl. .......................... 370/227; 370/236; 370/242
(58) Field of Classification Search .......... 370/216–228, 370/235, 236, 236.1, 236.2, 241, 241.1, 242
See application file for complete search history.

(56) References Cited

U.S. PATENT DOCUMENTS

| | | | |
|---|---|---|---|
| 5,495,472 A | 2/1996 | Ohara | |
| 6,992,978 B1 * | 1/2006 | Humblet et al. | 370/228 |
| 2002/0159458 A1 * | 10/2002 | Foster et al. | 370/392 |
| 2004/0107382 A1 * | 6/2004 | Doverspike et al. | 714/4 |
| 2005/0013242 A1 * | 1/2005 | Chen et al. | 370/228 |
| 2006/0056308 A1 * | 3/2006 | Gusat et al. | 370/252 |
| 2006/0067210 A1 * | 3/2006 | Liu et al. | 370/217 |

FOREIGN PATENT DOCUMENTS

JP 7-95227 4/1995

OTHER PUBLICATIONS

Jonathan P. Lang et al., "Generalized Multi-Protocol Label Switching (GMPLS) Recovery Functional Specification" IETF Standard-Working-Draft, Internet Engineering Task Force, IETF, CH, Apr. 2005, XP015038131.
Y. Lee et al., "Framework for the Policy-Based Recovery Mechanism in GMPLS Network", IETF Standard-Working-Draft, Internet Engineering Task Force, IETF, CH, May 30, 2006, XP015045547.
CCAMP GMPLS P&R Design Team, J.P. Lang et al., "RSVP-TE Extensions in support of End-to-End Generalized Multi-Protocol Label Switching (GMPLS)-based Recovery", IETF Standard-Working-Draft, Internet Engineering Task Force, IETF, CH, Apr. 2005, XP015038129.
Extended European Search Report, mailed May 11, 2007 and issued in corresponding European Patent Application No. 07005246.9-2416.

* cited by examiner

*Primary Examiner* — Ricky Ngo
*Assistant Examiner* — Wei-Po Kao
(74) *Attorney, Agent, or Firm* — Staas & Halsey LLP

(57) ABSTRACT

An extra traffic is transmitted in a redundant communication network using a backup path. A working communication path and the backup communication path connect two switching nodes. A switching control packet including information representing whether a first traffic passes through the working communication path is transmitted between the two switching nodes via the backup communication path. Under normal conditions, the first traffic passes the working communication path. A backup node that has received the second traffic from outside the backup communication path, determines whether the first traffic is passing through the working communication path based on information included in the switching control packet. If the first traffic is passing through the working communication path, the backup node transmits the second traffic to another backup node along the backup communication path.

16 Claims, 22 Drawing Sheets

METHOD AND DEVICE USING A BACKUP COMMUNICATION PATH TO TRANSMIT EXCESS TRAFFIC

BACKGROUND OF THE INVENTION

1. Field of the Invention

The present invention relates to a technique of enabling redundant communication between nodes in a network, and, more particularly, to a packet communication method and a packet communication device capable of effectively using a communication bandwidth of a backup communication path in 1:1 redundant communication. In the 1:1 redundant communication, nodes are interconnected by a working communication path and the backup communication path. When the working communication path operates under normal conditions, no redundant packets are transmitted via the backup communication path.

2. Description of the Related Art

Currently, multipoint communication and the effective use of a bandwidth, which is achieved by bandwidth priority control, attract attention as techniques for use in a network such as an Ethernet network. The scope of application of these techniques has increased.

With the increase in the scope of application of these techniques, a fast failure recovery technique, that is, a technique for protecting a working communication path is required. For example, there is a known method utilizing the STP (Spanning Tree Protocol) as an Ethernet protection technique. However, since switching is performed in units of seconds in the known method, the known method cannot be used for the network of a common carrier. In order to overcome this difficulty, the ITU (International Telecommunication Union) made the recommendation G.8031 that enables fast switching (on the order of a few tens of milliseconds).

FIGS. 1 and 2 show the configuration of known 1:1 redundant communication corresponding to a configuration described in the ITU recommendation G.8031.

Here, if a communication path in a network is represented using the reference numbers of nodes in the network, a working communication path can be represented by a communication path 101-103-104-105-102. In the following description, this notation is used to represent a communication path. Accordingly, a backup communication path can be represented by a communication path 101-106-107-108-102.

Under normal conditions, that is, when the working communication path 101-103-104-105-102 is operating normally, traffic 200 for network users flows via the working communication path 101-103-104-105-102 as shown in FIG. 1. When a failure occurs in the working communication path 101-103-104-105-102, a communication path through which traffic passes is changed from the working communication path 101-103-104-105-102 to the backup communication path 101-106-107-108-102 using switching nodes 101 and 102, and traffic 201 is caused to flow the backup communication path 101-106-107-108-102 as shown in FIG. 2. Consequently, the working communication path 101-103-104-105-102 is protected. A switching control packet 203 for instructing control of switching between the working and backup communication paths is always transmitted between the switching nodes 101 and 102 via the backup communication path 101-106-107-108-102.

For example, if the network is an Ethernet network, VLAN (Virtual Local Area Network) based protection modes, that is, 1:1 unidirectional and bidirectional protection modes and 1+1 unidirectional and bidirectional protection modes are defined. In a bidirectional switching system, the APS (Automatic Protection Switching) protocol is used. The APS control packet 203 for instructing a bridge (corresponding to the switching node 101 shown in FIG. 1) and a selector (corresponding to the switching node 102 shown in FIG. 1) to perform switching between the working and backup communication paths is fed to the backup communication path 101-106-107-108-102. The bridge and selector form the protection entity defined by the G.8031 recommendation. This APS control packet includes switching control request information (including identification information used to determine whether the working communication path is used) for the bridge and selector and information on the condition of each node. The switching nodes 101 and 102 receive and process this APS control packet, whereby the control of switching between the working and backup communication paths is performed.

Under normal conditions, users' traffic is not fed to the backup communication path 101-106-107-108-102 as shown in FIG. 1. That is, if the traffic 200 passes through the working communication path 101-106-107-108-102, there is no traffic in the backup communication path 101-106-107-108-102 other than the APS control packet 203, which is used to instruct the bridge and selector (switching nodes 101 and 102) defined by the G.8031 recommendation to perform switching control. Thus, the efficiency of the communication bandwidth of the backup communication path 101-106-107-108-102 is low.

The ATM protection recommendation (I.630) that uses the same system as Ethernet and the SDH protection recommendation (G.841) also define transmission and reception of traffic carried by the backup communication path while the working communication path is active in the 1:1 (bidirectional) protection mode, that is, define transmission and reception of extra traffic. However, the transmission and reception of the extra traffic is performed via the bridge and selector in accordance with the existing recommendations, that is, is limited to the transmission and reception of traffic via the switching nodes 101 and 102 shown in FIGS. 1 and 2. Accordingly, for example, it is difficult to perform transmission and reception of traffic in a closed communication path between nodes 106, 107, and 108 without causing the traffic to pass through the switching nodes 101 and 102. This is an impediment to the effective use of the communication bandwidth of the backup communication path.

As a related technique, Japanese Unexamined Patent Application Publication No. 7-95227 discloses a protection method for use in the case of a ring network.

SUMMARY OF THE INVENTION

As shown in FIGS. 1 and 2, in a known 1:1 redundant communication method, if traffic for network users passes through a working communication path, there is no traffic in a backup communication path other than a switching control packet for instructing control of switching between the working and backup communication paths. This is a problem for the efficiency of the communication bandwidth of the backup communication path.

It is an object of the present invention to enable flexible communication in the backup communication path and to effectively use the communication bandwidth of the backup communication path in 1:1 redundant communication by controlling extra traffic on the basis of the condition of the switching control packet that is used to perform switching between the working and backup communication paths and is transmitted via the backup communication path.

A packet communication method of facilitating packet communication between nodes in a network according to an embodiment of the present invention includes: selecting one of a working communication path and a backup communication path connected by two switching nodes, transmitting first traffic between the two switching nodes via the selected communication path, and transmitting a switching control packet between the two switching nodes via the backup communication path, the switching control packet including working communication path identification information representing whether the first traffic passes through the working communication path; causing the switching nodes to select the working communication path as a communication path through which the first traffic passes when the working communication path operates under normal conditions, and to select the backup communication path as a communication path through which the first traffic passes when a failure occurs in the working communication path; and causing backup nodes included in the backup communication path to determine whether the first traffic passes through the working communication path on the basis of the working communication path identification information included in the switching control packet, and causing other backup node(s) to receive second traffic different from the first traffic and to transmit the received second traffic to other backup node(s) when the first traffic passes through the working communication path, the backup nodes being nodes other than the switching nodes included in the backup communication path.

According to the packet communication method, when the first traffic passes through the working communication path, the second traffic different from the first traffic can be caused to pass through the backup communication path, whereby the communication bandwidth of the backup communication path can be effectively used.

In the packet communication method according to an embodiment of the present invention, the backup nodes determine whether the first traffic passes through the working communication path on the basis of the working communication path identification information included in the switching control packet. When the first traffic does not pass through the working communication path, other backup node(s) may receive the second traffic, control the bandwidth of the received second traffic, and transmit the bandwidth-controlled second traffic to other backup node(s).

According to the packet communication method, even if the first traffic passes through the backup communication path, the second traffic different from the first traffic can be caused to pass through the backup communication path after being bandwidth-controlled. Here, for example, the bandwidth of the second traffic is decreased so that the bandwidth thereof can be equal to or less than a predetermined bandwidth, or priority control information included in the second traffic is converted into a predetermined value.

In the packet communication method according to an embodiment of the present invention, the switching nodes determine whether the first traffic passes through the working communication path on the basis of the working communication path identification information included in the switching control packet. When the first traffic does not pass through the working communication path, one of the switching nodes may receive the second traffic, control the bandwidth of the received second traffic, and transmit the bandwidth-controlled second traffic to other backup node(s).

According to the packet communication method, even if the first traffic passes through the backup communication path, the second traffic different from the first traffic can be input into one of the switching nodes, and can be transmitted to another node included in the backup communication path after being bandwidth-controlled.

According to an embodiment of the present invention, when the first traffic passes through the working communication path, the second traffic different from the first traffic can be caused to pass through the backup communication path. In addition, even if the first traffic does not pass through the working communication path (that is, when the first traffic passes through the backup communication path), the second traffic different from the first traffic can be caused to pass through the backup communication path after being bandwidth-controlled.

Consequently, effective use of bandwidth can be achieved without reducing the level of protection for a packet. Even if a failure occurs in the working communication path, multipoint communication can be achieved in the backup communication path without completely stopping traffic for users by performing bandwidth control.

DESCRIPTION OF THE PREFERRED EMBODIMENTS

An embodiment of the present invention enables flexible communication in a backup communication path by controlling traffic of a node included in the backup communication path on the basis of the details of a redundant switching control packet transmitted via the backup communication path in a 1:1 redundant communication system. In the 1:1 redundant communication system, nodes are interconnected by a working communication path and the backup communication path, and when the working communication path operates under normal conditions, a redundant packet is not transmitted between the nodes via the backup communication path.

Figure 3:
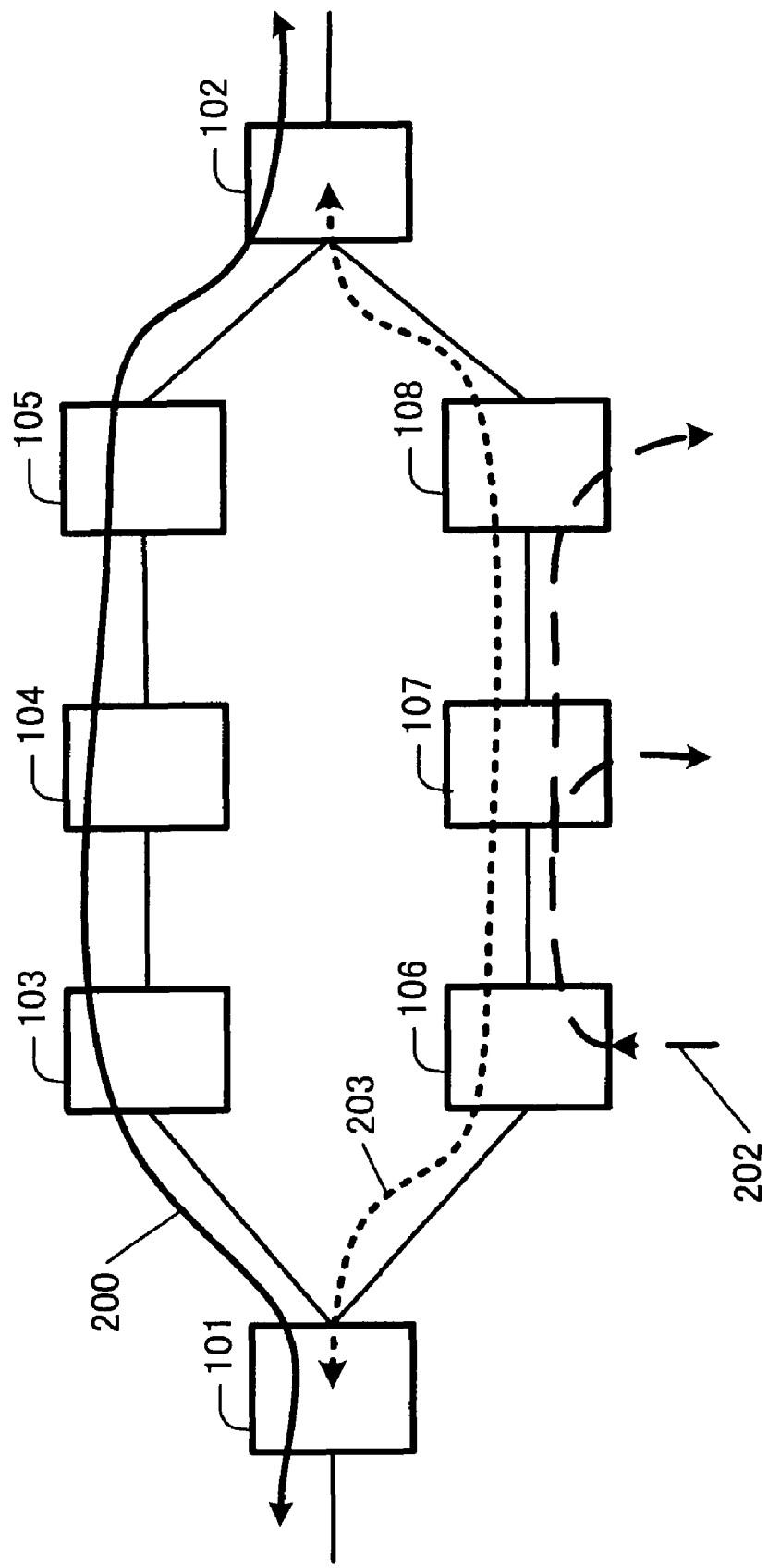
FIG. 3 is a diagram showing an example of packet transmission according to a first embodiment of the present invention in a backup communication path when a working communication path is active.

FIG. 3 shows an example of packet transmission according to a first embodiment of the present invention in a backup communication path when a working communication path is active. In the following description, traffic for network users passing through a working communication path 101-103-104-105-102 is represented by first traffic 200, and traffic for network users passing through a backup communication path 101-106-107-108-102 is represented by first traffic 201.

Here, a case is shown as a representative example in which traffic is transmitted between nodes of a communication path 106-107-108 included in the backup communication path, that is, traffic transmission by means of multipoint connection is performed between nodes 106, 107, and 108 when the first traffic 200 passes through the working communication path 101-103-104-105-102.

In the first embodiment of the present invention, while the first traffic 200 passes through the working communication path 101-103-104-105-102, second traffic 202 different from the first traffic 200 can pass through the communication path 106-107-108 included in the backup communication path. For example, as shown in FIG. 3, the second traffic 202 input into the backup node 106 can be transmitted to the backup nodes 107 and 108 in a multipoint communication form. The input of the second traffic 202 into the communication path 106-107-108 included in the backup communication path is performed on the basis of the details of the switching control packet 203 that always passes through the backup communication path 101-106-107-108-102.

Figure 4:
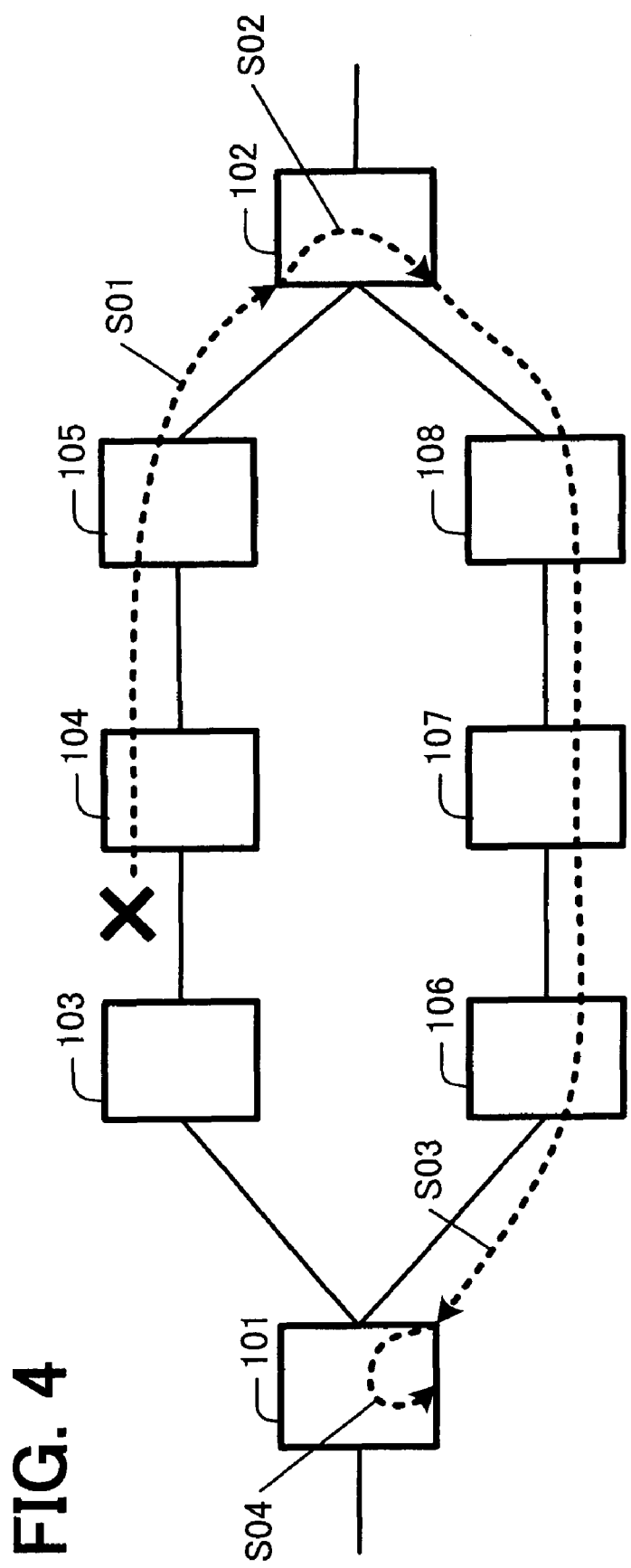
FIG. 4 is a diagram describing a flow of a switching control packet when a failure occurs in the working communication path.

FIG. 4 is a diagram describing the flow of a switching control packet when a failure occurs in the working communication path. An exemplary sequence of events from the occurrence of the failure in the working communication path to the performance of switching between communication paths is represented by a sequence from S01 to S06.

In S01, a node 104 detects the failure that has occurred in a communication path between nodes 103 and 104 included in the working communication path, and notifies a switching node 102 of the occurrence of the failure. Alternatively, the switching node 102 detects a failure that has occurred in the working communication path 101-103-104-105-102.

In S02, the switching node 102 changes a communication path for the first traffic 200 to the backup communication path 101-106-107-108-102, and transmits via the backup communication path the switching control packet 203 (for example, an APS control packet) including information on the fact that the first traffic 200 does not pass through the working communication path.

In S03, the switching control packet 203 including information on the fact that the first traffic 200 does not pass through the working communication path is sequentially transmitted from the switching node 102 to the backup nodes 108, 107, and 106. At that time, if the second traffic 202 has been input into the backup nodes 108, 107, and 106, the backup nodes 108, 107, and 106 remove it so as not to apply the effect of the second traffic 202 to the first traffic to be transmitted via the backup communication path.

In S04, the switching node 101 changes the communication path through which the first traffic 201 passes to the backup communication path 101-106-107-108-102, and transmits the switching control packet 203 back to the switching node 102 via the backup communication path 101-106-107-108-102. Thus, the individual backup nodes predict on a timely basis that the communication path for the first traffic will be changed from the working communication path to the backup communication path by referring to the information on the first traffic included in the switching control packet 203 transmitted between the switching nodes 101 and 102, and then prepare to allow the first traffic 201 to pass through the backup communication path.

Figure 5:
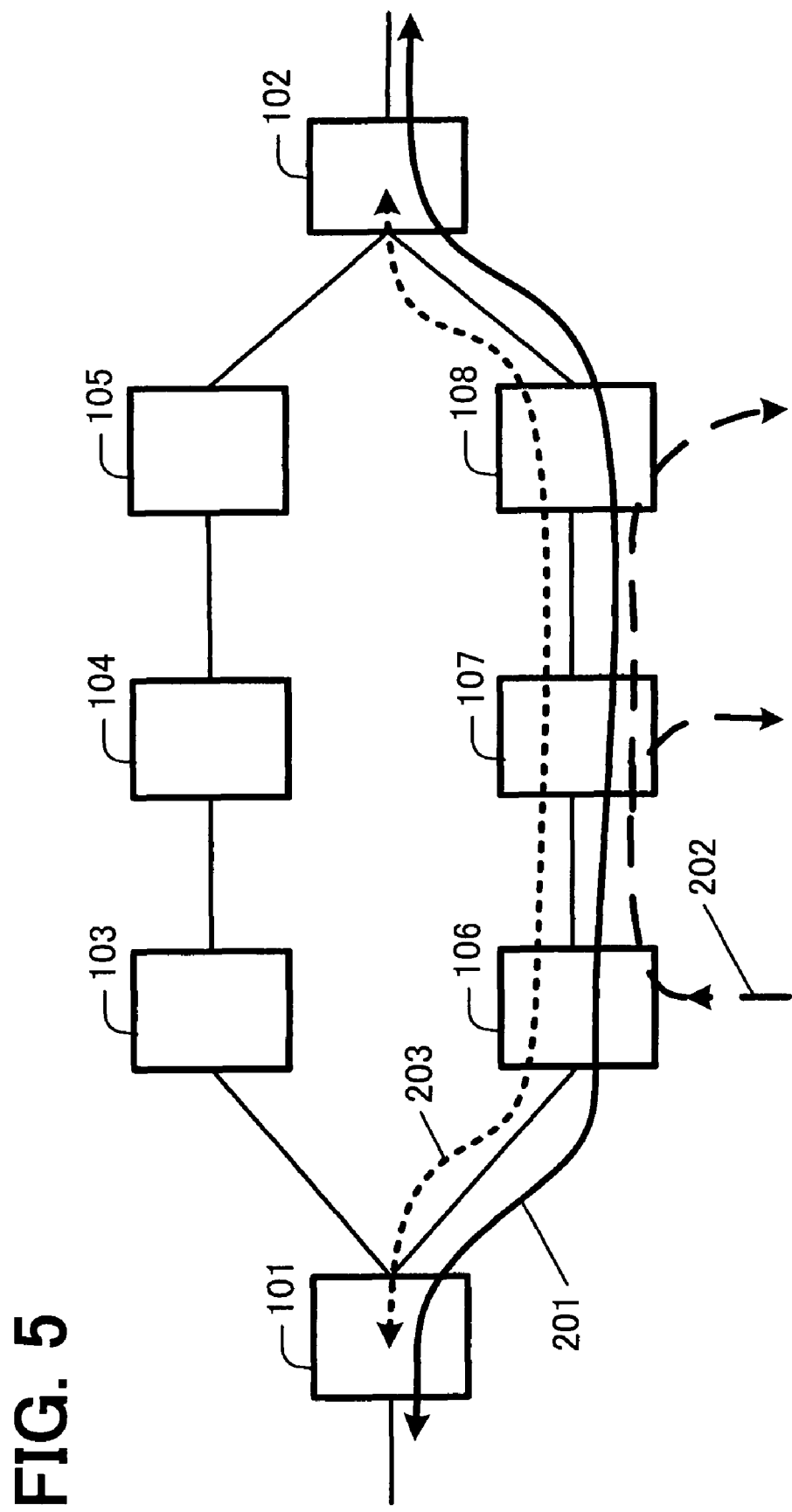
FIG. 5 is a diagram showing an example of transmission of second traffic according to a second embodiment of the present invention.

FIG. 5 shows an example of second traffic transmission according to a second embodiment of the present invention. In the first embodiment shown in FIG. 3, the case is illustrated in which the second traffic 202 different from the first traffic is fed to the communication path 106-107-108 included in the backup communication path while the first traffic 200 passes through the working communication path 101-103-104-105-102.

On the other hand, FIG. 5 shows a case in which the bandwidth-controlled second traffic 202 is input into the communication path 106-107-108 included in the backup communication path 101-106-107-108-102 while the first traffic 201 passes through the backup communication path 101-106-107-108-102 instead of the working communication path, and the first traffic 201 and the second traffic 202 pass through the communication path 106-107-108 included in the backup communication path in parallel. Consequently, even if a failure occurs in the working communication path, for example, the bandwidth-decreased second traffic 202 can be transmitted via the backup communication path along with the first traffic 201 at the same time.

Figure 6:
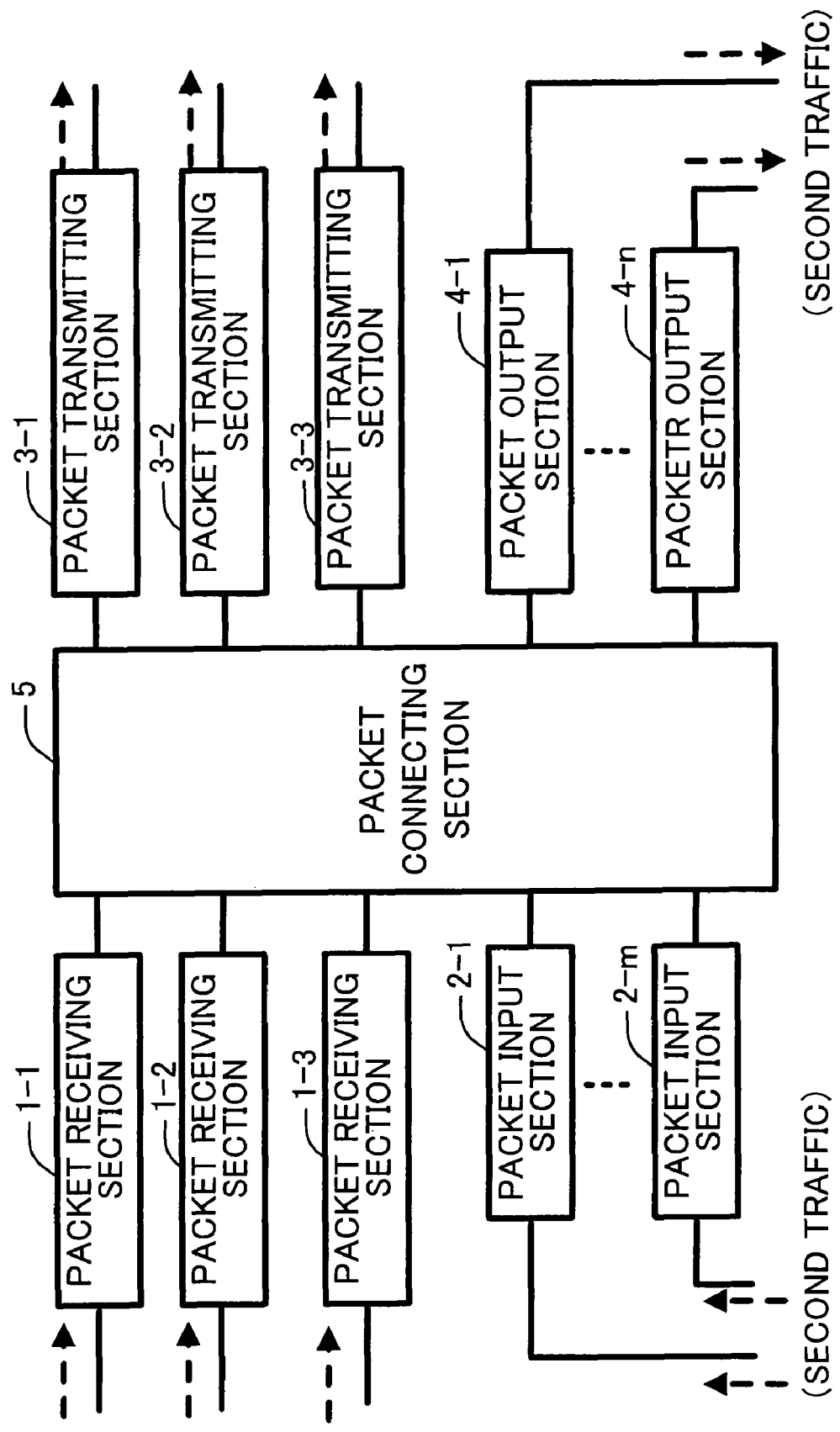
FIG. 6 is a diagram showing a configuration of a communication device according to an embodiment of the present invention.

FIG. 6 shows the configuration of a packet communication device according to an embodiment of the present invention. In the exemplary configuration shown in FIG. 6, three packet receiving sections are implemented as a packet receiving section 1. In order to distinguish between the three packet receiving sections, these packet receiving sections are represented by numerals 1-1, 1-2, and 1-3, but the configurations of the packet receiving sections are the same. This notation is similarly used for a packet transmitting section 3, a packet input section 2, and a packet output section 4.

Figure 1:
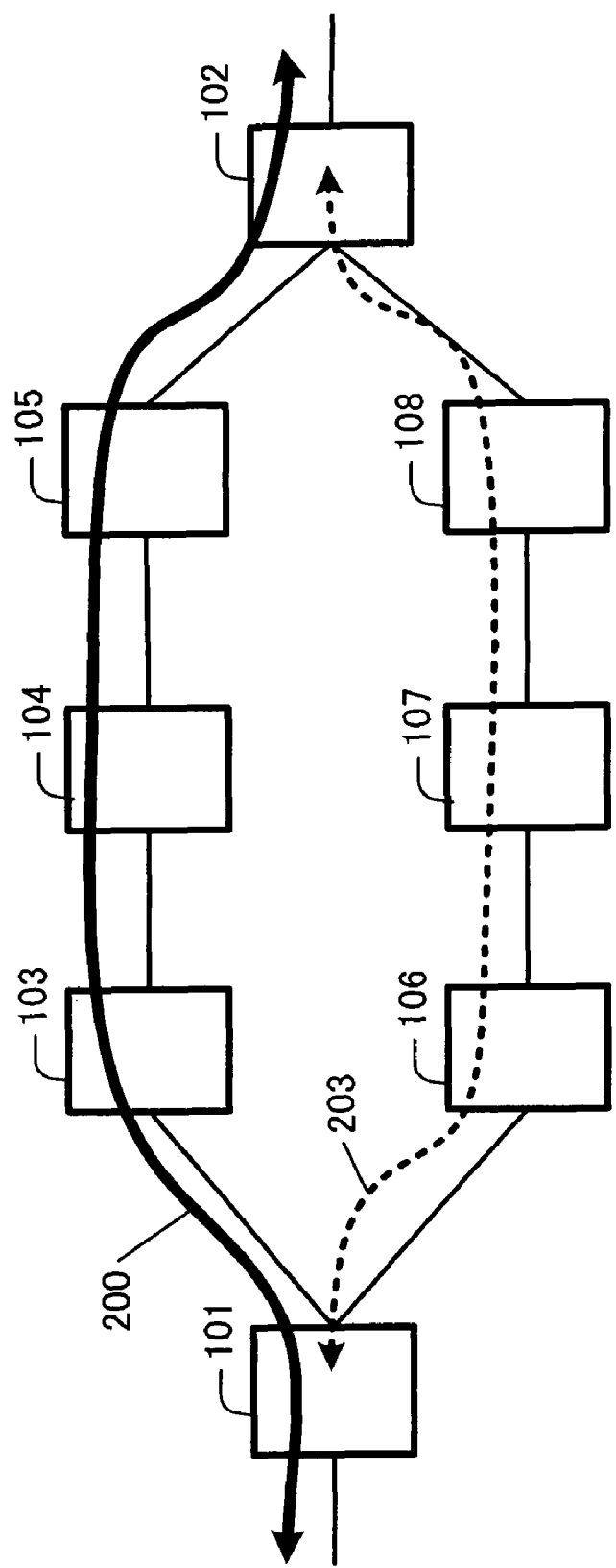
FIG. 1 is a diagram showing a configuration (1) of known 1:1 redundant communication.
Figure 2:
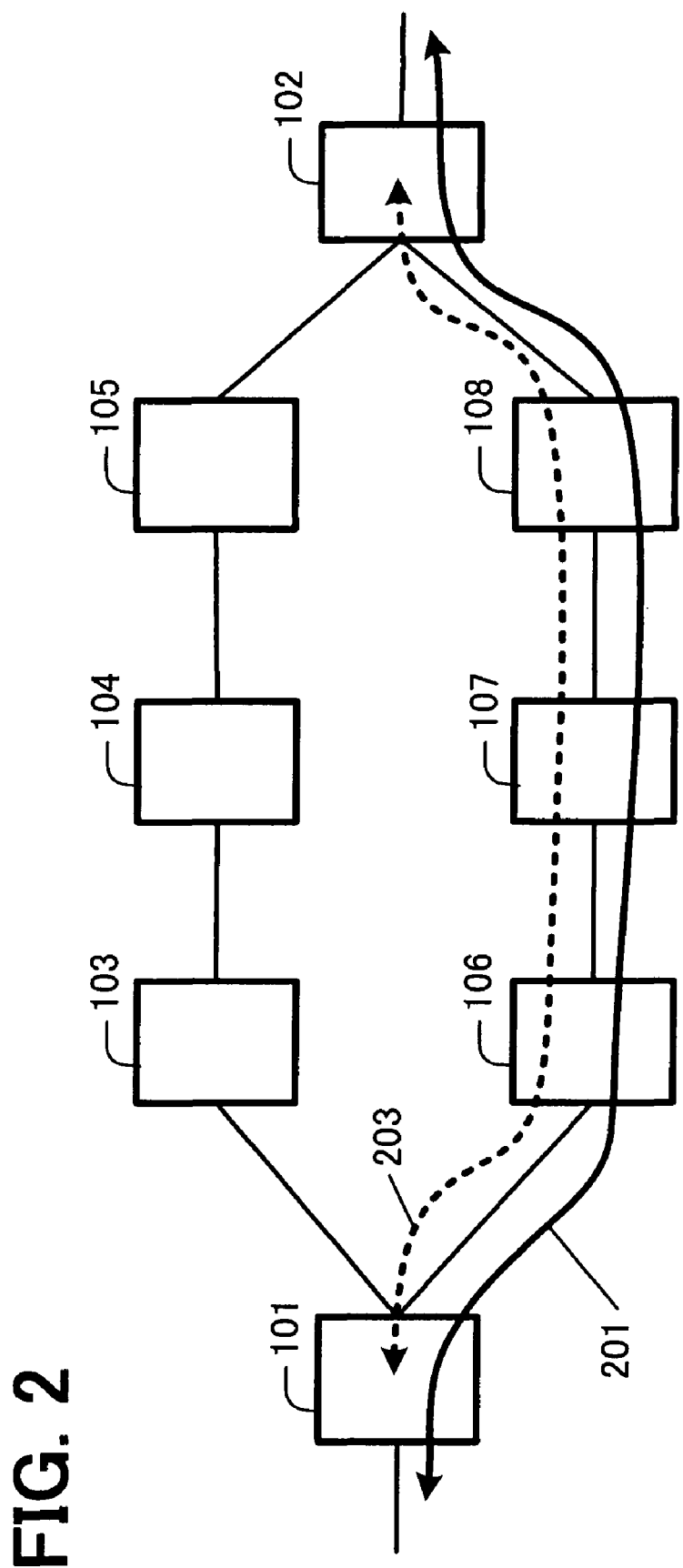
FIG. 2 is a diagram showing a configuration (2) of known 1:1 redundant communication.

A pair of the packet receiving section 1-1 and the packet transmitting section 3-1 performs bidirectional communication over a single communication link, and the packet receiving section 1-1 and the packet transmitting section 3-1 receives and transmits a packet from and to an adjacent node, respectively. A pair of the packet receiving section 1-2 and the packet transmitting section 3-2 and a pair of the packet receiving section 1-3 and the packet transmitting section 3-3 perform the same processing as above. In FIG. 6, although the three pairs of the packet receiving section and the packet transmitting section are shown for convenience of explanation, the pair of the packet receiving section 1-3 and the packet transmitting section 3-3 is applied only to the switching nodes 101 and 102 shown in FIG. 1, etc., and is not applied to other nodes.

A packet input section 2-1 for receiving second traffic is configured to input the second traffic 202 different from the first traffic 201 into the backup communication path. A packet output section 4-1 is configured to output the second traffic 202 transmitted via the backup communication path out of a network. The number m of packet input sections for receiving the second traffic and the number n of packet output sections are each an arbitrary integer of zero or more. In FIG. 6, the packet input section 2-1, a packet input section 2-m, the packet output section 4-1, and a packet output section 4-n are representatively shown.

A packet connecting section 5 receives packets from the packet receiving sections 1-1 to 1-3 and the packet input sections 2-1 to 2-m, and transmits the packets to the packet transmitting sections 3-1 to 3-3 and the packet output sections 4-1 to 4-n.

A packet communication device according to an embodiment of the present invention, that is, a node is configured with the single packet connecting section 5, and the required number of packet receiving sections, packet transmitting sections, packet input sections, and packet output sections. The number is changed in accordance with a network connection status.

For example, in the exemplary network configuration according to the first embodiment of the present invention shown in FIG. 3, there are three nodes adjacent to the switching node 101. Accordingly, the packet receiving section 1-1 and the packet transmitting section 3-1 can be disposed for a communication link between the nodes 101 and 103, the packet receiving sections 1-3 and the packet transmitting section 3-3 can be disposed for a communication link between the nodes 101 and 106, and the packet receiving section 1-2 and the packet transmitting section 3-2 can be disposed for a communication link between the node 101 and a node (not shown) on the left side of the node 101.

In the case of the backup node 106 shown in FIG. 3, there are two adjacent nodes (the switching node 101 and the backup node 107). The packet receiving and transmission between the backup node 106 and the switching node 101 can be performed by the packet receiving section 1-1 and the packet transmitting section 3-1, respectively. The packet receiving and transmission between the backup nodes 106 and 107 can be performed by the packet receiving section 1-2 and the packet transmitting section 3-2, respectively. In this case, the packet receiving section 1-3 and the packet transmitting section 3-3 are not required. The packet input section and the packet output section are disposed as appropriate, but in order to input the second traffic 202 into the backup communication path as shown in FIG. 3, at least one packet input section (for example, the packet input section 2-1) is required.

In the case of the backup node 108 shown in FIG. 3, there are two adjacent nodes (the backup node 107 and the switching node 102). The packet receiving and transmission between the backup nodes 108 and 107 can be performed by the packet receiving section 1-1 and the packet transmitting section 3-1, respectively. The packet receiving and transmission between the backup node 108 and the switching node 102 can be performed by the packet receiving section 1-2 and the packet transmitting section 3-2, respectively. In this case, the packet receiving section 1-3 and the packet transmitting section 3-3 are not also required. The packet input section and the packet output section are disposed as appropriate, but in order to output the second traffic 202 out of the network as shown in FIG. 3, at least one packet output section (for example, the packet output section 4-1) is required.

In exemplary node configurations shown in FIGS. 7, 8, 9, 10, 14, 15, 18, 19, 21, and 22, description will be made on the basis of the above-described exemplary node configuration.

Figure 7:
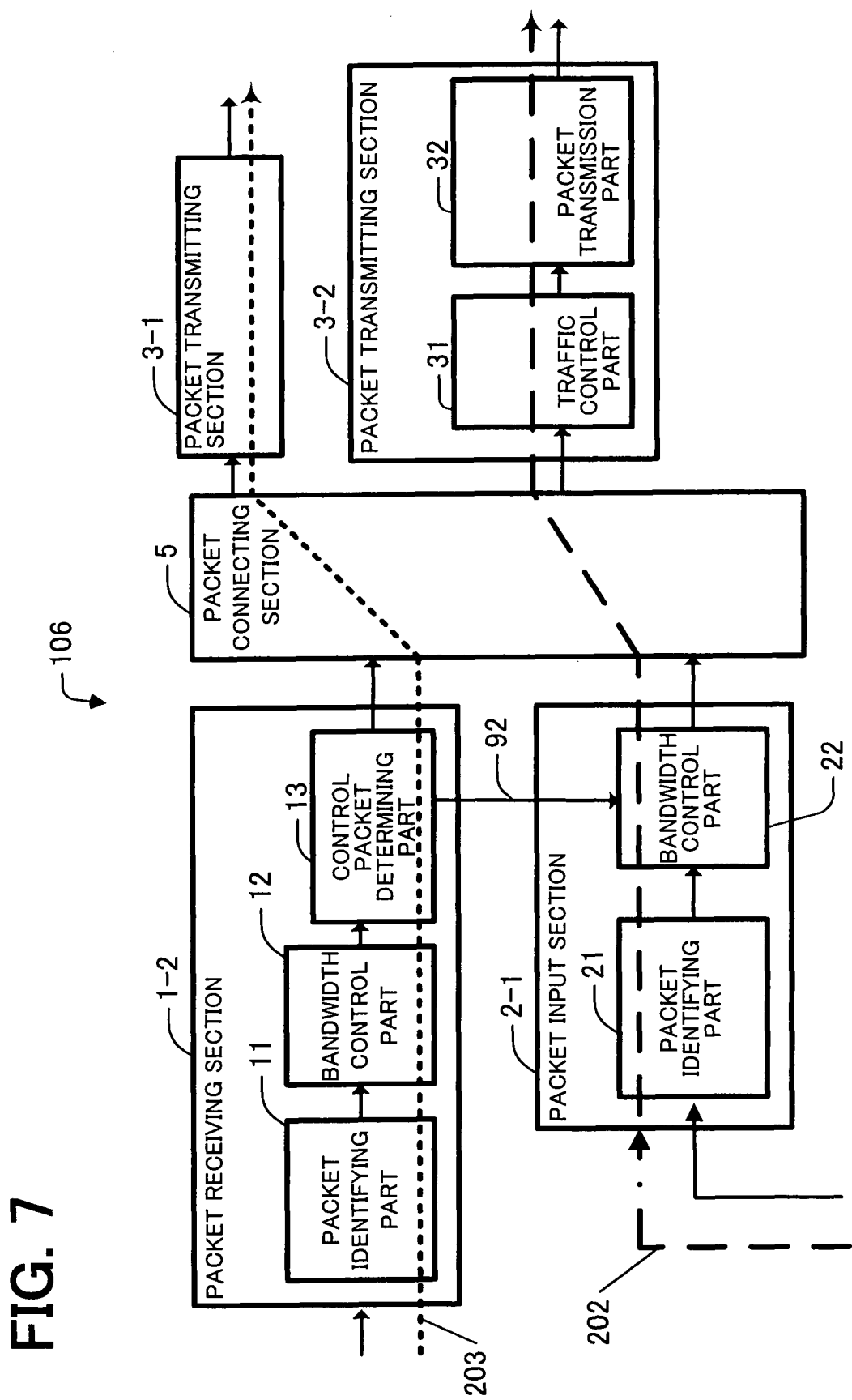
FIG. 7 is a diagram showing an exemplary node configuration and packet flow (1) according to the first embodiment of the present invention.
Figure 8:
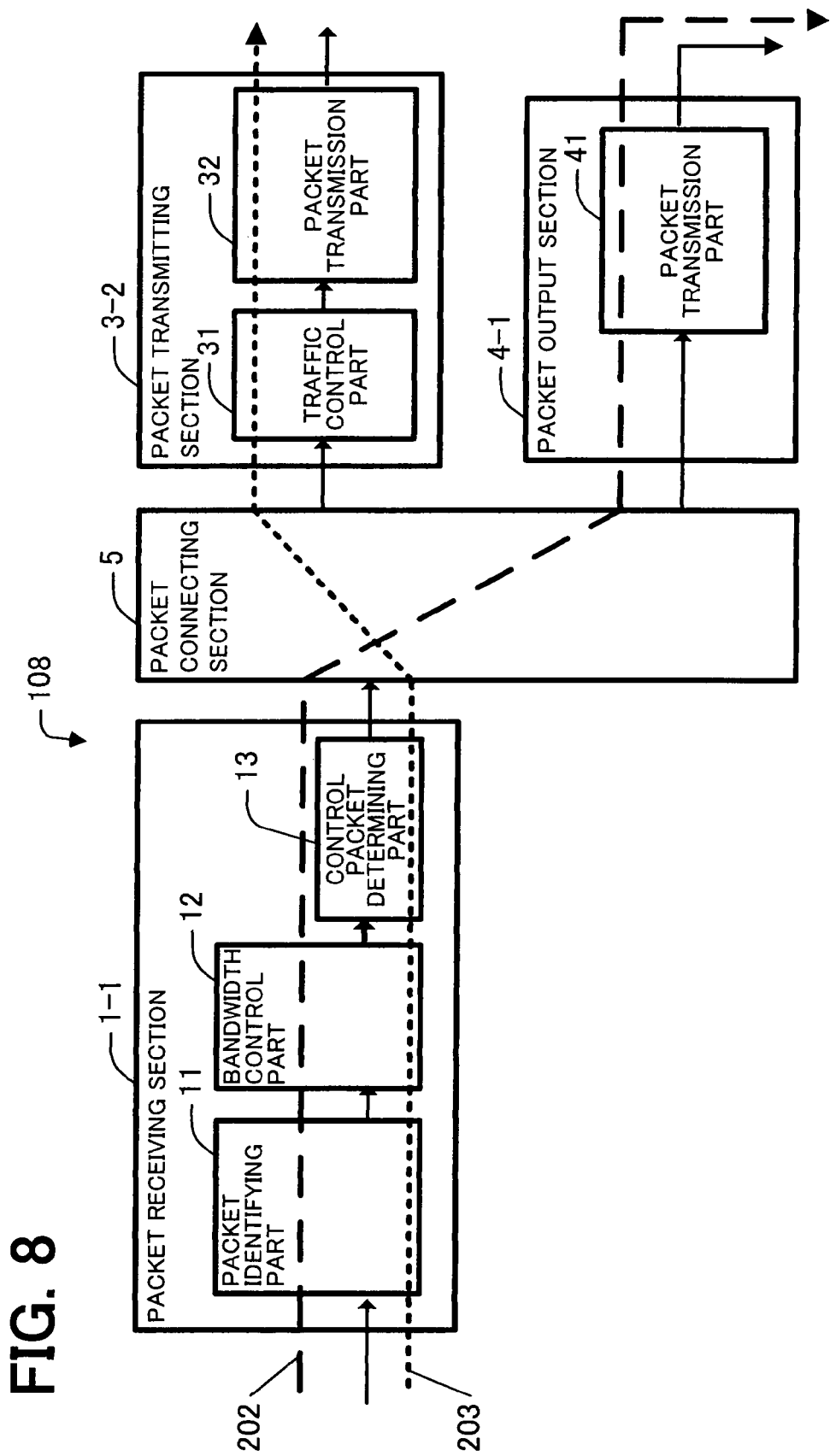
FIG. 8 is a diagram showing an exemplary node configuration and packet flow (2) according to the first embodiment of the present invention.

FIGS. 7 and 8 show exemplary node configurations and packet flows according to the first embodiment of the present invention. First, FIG. 7 shows an exemplary configuration and packet flow of the node 106 in the case shown in FIG. 3 in which the second traffic 202 is caused to pass through the communication path 106-107-108 included in the backup communication path in a multidrop communication form while the working communication path 101-103-104-105-102 is active, that is, while the first traffic 200 passes through the working communication path 101-103-104-105-102. Here, the packet receiving section 1-2 receives a packet from the adjacent backup node 107, the packet transmitting section 3-1 transmits the packet to the adjacent switching node 101, and the packet transmitting section 3-2 transmits a packet to the adjacent backup node 107. The packet receiving section 1-1 for receiving a packet from the adjacent switching node 101 is omitted for the sake of simplifying this drawing. Since FIG. 7 shows the case in which the first traffic passes through the working communication path, the first traffic 201 is not transmitted to the backup node 106 and is not shown in FIG. 7.

A packet identifying part 11 included in the packet receiving section 1-2 identifies the packet received from the adjacent backup node 107. A bandwidth control part 12 determines whether the received packet is the switching control packet 203. If the packet is the switching control packet 203, the bandwidth control part 12 transmits the packet to a control packet determining part 13.

In addition, the packet identifying part 11 determines whether the received packet is the second traffic 202. If the received packet is the second traffic 202, the packet identifying part 11 transmits the packet to the packet output section 4-1 (not shown in FIG. 7) via the bandwidth control part 12. If the network is an Ethernet network, this identification of the received packet is performed on the basis of VLAN tag information included in the header portion of the received packet using a known method.

The control packet determining part 13 determines whether the first traffic 200 passes through the working communication path on the basis of working communication path identification information included in the switching control packet 203 transmitted from the bandwidth control part 12. If the first traffic 200 passes through the working communication path (FIG. 7 illustrates this case), the control packet determining part 13 transmits an instruction signal 92 to a bandwidth control part 22 included in the packet input section 2-1 so as to instruct the bandwidth control part 22 to change the current mode to a packet transmission mode in which the second traffic 202 different from the first traffic is input. On the other hand, if the first traffic 200 does not pass through the working communication path, that is, if the first traffic 201 is caused to pass through the backup communication path, the control packet determining part 13 instructs the bandwidth control part 22 included in the packet input section 2-1 using the instruction signal 92 to change the current mode to a packet blocking mode in which the second traffic 202 is removed. Subsequently, the control packet determining part 13 transmits the received switching control packet 203 to the packet transmitting section 3-1. The packet transmitting section 3-1 transmits the switching control packet 203 to the adjacent switching node 101.

A packet identifying part 21 included in the packet input section 2-1 identifies the second traffic 202, which has been input from a communication apparatus such as a terminal connected to the backup node 106 and is different from the first traffic, and then transmits the second traffic 202 to the bandwidth control part 22. If the network is an Ethernet network, this packet identification of the packet identifying part 21 is performed on the basis of a VLAN tag included in the header portion of the received packet using a known method. The received packet is transmitted to the packet transmitting section 3-2 via the bandwidth control part 22 on the basis of the result of the identification.

The bandwidth control part 22 has packet processing mode information used to determine whether the received second traffic 202 is transmitted. This packet processing mode information is rewritten using the instruction signal 92 transmitted from the control packet determining part 13 included in the packet receiving section 1-2. If the packet processing mode information indicates the packet transmission mode, the bandwidth control part 22 transmits the second traffic 202, which has been transmitted from the packet identifying part 21, to the packet transmitting section 3-2. If the packet processing mode information indicates the packet blocking mode, the bandwidth control part 22 removes the received second traffic 202.

The packet transmitting section 3-2 transmits the packets, which have been transmitted via the packet connecting section 5 from the packet receiving section 1-1 and the packet input section 2-1, to the adjacent backup node 107. A traffic control part 31 assigns priorities to the packets to be transmitted to a packet transmission part 32, and then the packet transmission part 32 transmits the packets to the adjacent backup node 107.

Thus, in the first embodiment of the present invention, the control packet determining part 13 is disposed. The control packet determining part 13 determines whether the first traffic 200 passes through the working communication path by monitoring the switching control packet 203 (for example, an APS packet in the case of an Ethernet network) that always passes through the backup communication path (for example, at a fixed cycle) and is used to control switching between the working communication path and the backup communication path in the 1:1 bidirectional communication system. If the first traffic 200 passes through the working communication path, the control packet determining part 13 instructs the bandwidth control part 22 included in the packet input section 2-1 for receiving the second traffic to set the packet transmission mode. The bandwidth control part 22 included in the packet input section 2-1 retains the instruction of the packet transmission mode as the packet processing mode information.

If the first traffic 200 does not pass through the working communication path, that is, if the first traffic 201 is caused to pass through the backup communication path, the control packet determining part 13 instructs the bandwidth control part 22 included in the packet input section 2-1 for receiving the second traffic to set the packet blocking mode. The bandwidth control part 22 included in the packet input section 2-1 retains the identification information indicating the instruction of the packet blocking mode transmitted from the control packet determining part 13 as the packet processing mode information.

Subsequently, the bandwidth control part 22 included in the packet input section 2-1 determines the packet processing mode information that has been set as above. If the packet processing mode information indicates the packet transmission mode, the bandwidth control part 22 transmits the received second traffic 202 to the packet transmitting section 3-2. If the packet processing mode information indicates the packet blocking mode, the bandwidth control part 22 removes the received second traffic 202. Thus, in the first embodiment of the present invention, the first traffic 200 can be protected as usual by monitoring whether the first traffic 200 passes through the working communication path. In addition, the second traffic 202 different from the first traffic can be caused to pass through the backup communication path.

Next, FIG. 8 shows an exemplary configuration and packet flow of the node 108 in the same case shown in FIG. 7 in which the second traffic 202 is caused to pass through the communication path 106-107-108 included in the backup communication path in the multidrop communication form while the working communication path 101-103-104-105-102 is active, that is, while the first traffic 200 passes through the working communication path 101-103-104-105-102. Here, the packet receiving section 1-1 receives a packet from the adjacent backup node 107, and the packet transmitting section 3-2 transmits the packet to the adjacent switching node 102. The packet receiving section 1-2 for receiving a packet from the switching node 102 and the packet transmitting section 3-1 for transmitting the packet to the adjacent backup node 107 are omitted for the sake of simplifying this drawing. Like the case shown in FIG. 7, the first traffic 200 passes through the working communication path, and the first traffic 201 is not shown in FIG. 8.

The packet receiving section 1-1 receives the second traffic 202 that has been input into the backup node 106. This is different from the case shown in FIG. 7. In this case, the packet identifying part 11 identifies the second traffic 202, and transmits the second traffic 202 to the packet output section 4-1 via the bandwidth control part 12. For example, if the network is an Ethernet network, this processing of the packet identifying part 11 can be performed on the basis of a VLAN tag included in the header portion of the packet using a known method. In this case shown in FIG. 8, the packet receiving section 1-1 receives the switching control packet 203 returned from the direction opposite to the direction in which the switching control packet 203 flows in FIG. 7 as shown in step S04 in FIG. 4. At the time of receiving the switching control packet 203, the setting of the packet processing mode information has already been completed in each node included in the backup communication path as shown in step S04 in FIG. 4. Accordingly, the packet receiving section 1-1 may only transmit the switching control packet 203 to the adjacent switching node 102 via the packet transmitting section 3-2.

The packet output section 4-1 receives the second traffic 202 from the packet receiving section 1-1, and outputs the second traffic 202 via a packet transmission part 41 to a communication apparatus such as a terminal connected thereto (the node 108 in FIG. 8), thereby transmitting the second traffic 202 out of the network. The processing of the packet transmitting section 3-2 is the same as that described with reference to FIG. 7, and the detailed description thereof will be omitted.

Thus, the second traffic, which has been input into the backup node 106 while the first traffic 200 passes through the working communication path as shown in FIG. 7, is received via the backup node 107 by the backup node 108, and is then transmitted out of the network by the backup node 108. Thus, the communication bandwidth of the backup communication path can be effectively used.

Figure 9:
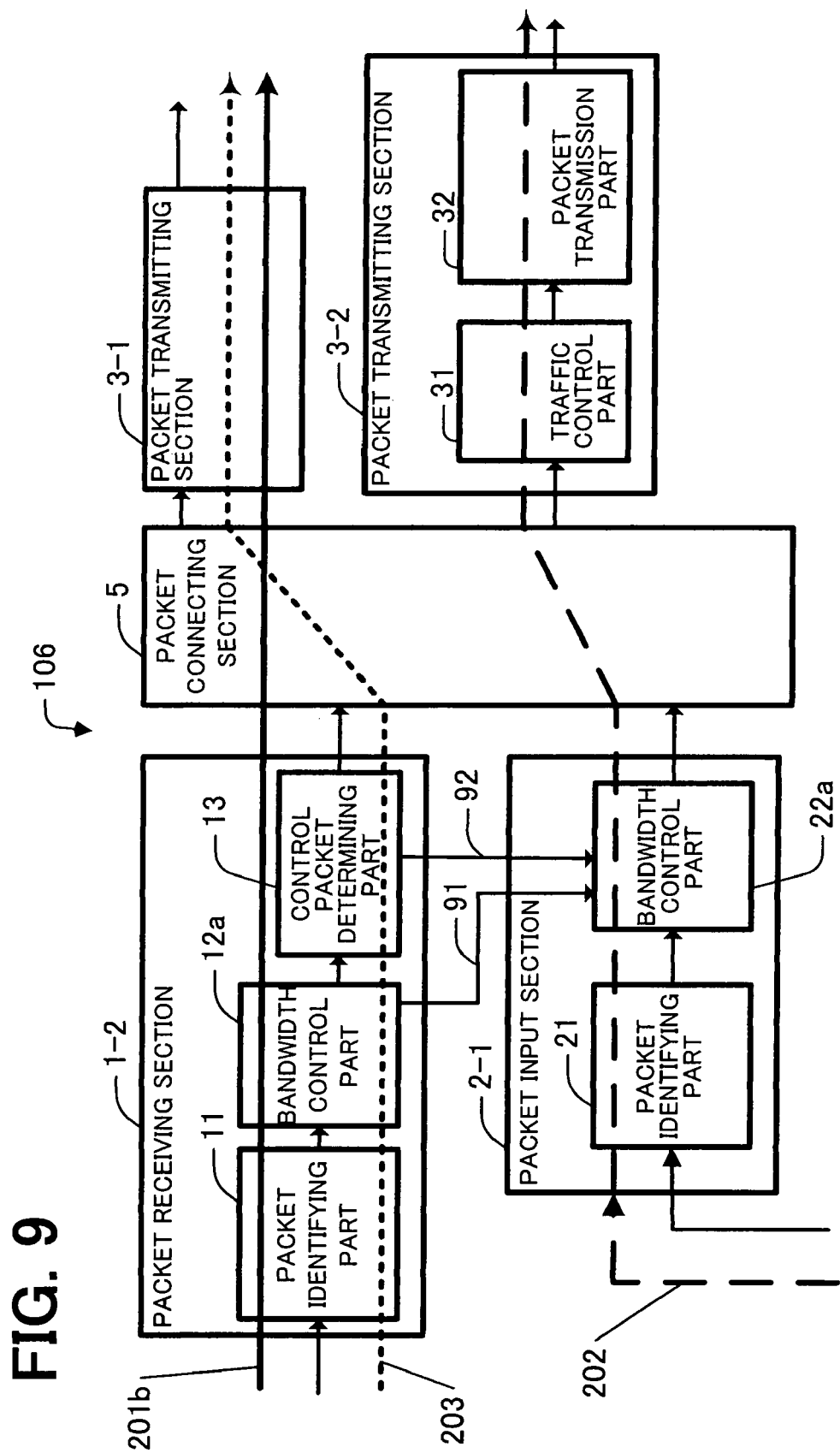
FIG. 9 is a diagram showing a node configuration and packet flow (1) according to the second embodiment of the present invention.
Figure 10:
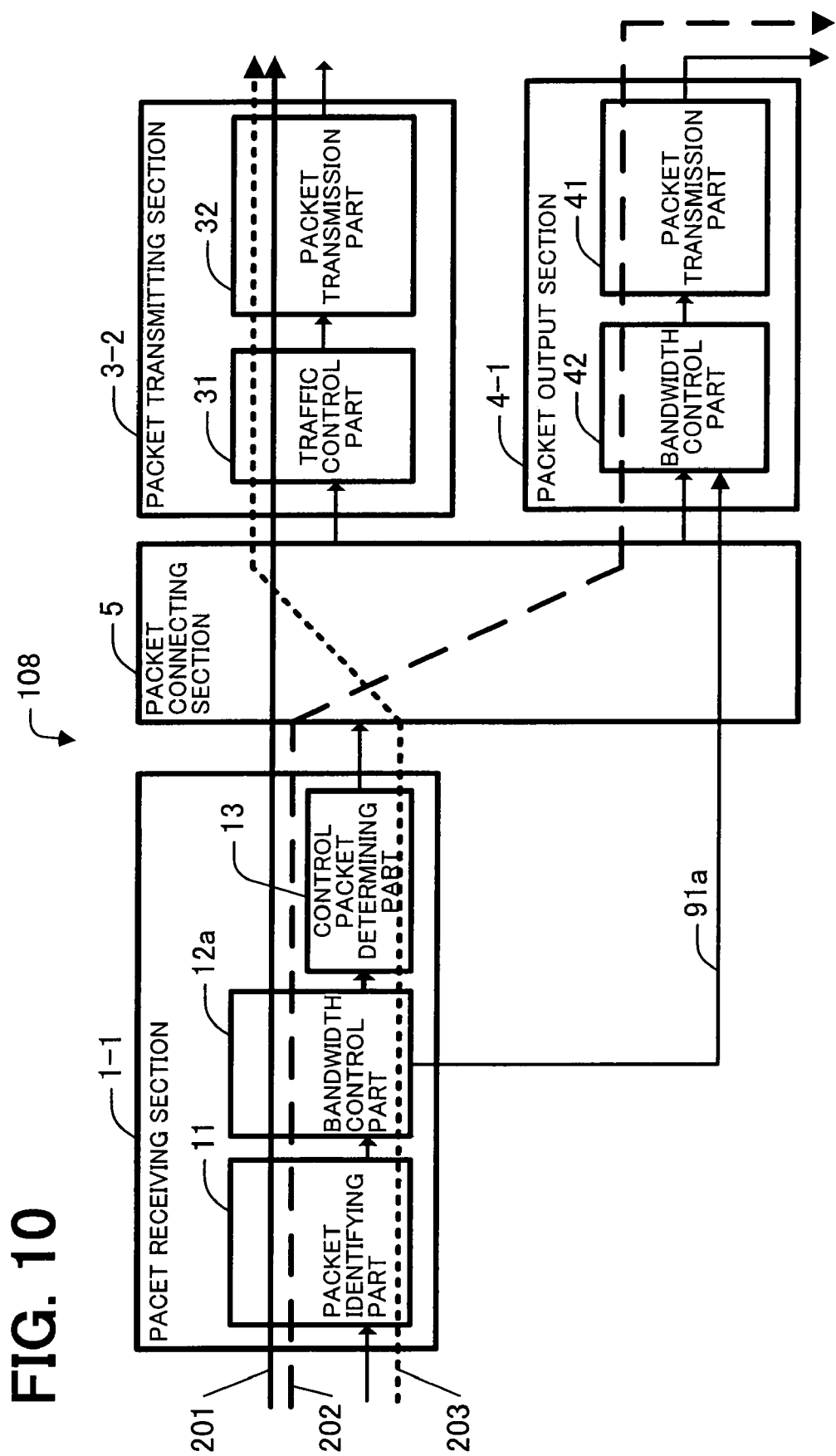
FIG. 10 is a diagram showing a node configuration and packet flow (2) according to the second embodiment of the present invention.

FIGS. 9 and 10 show node configurations and packet flows according to a second embodiment of the present invention. First, FIG. 9 shows an exemplary configuration and packet flow of the node 106 in the case shown in FIG. 5 in which the second traffic 202 is caused to pass through the communication path 106-107-108 included in the backup communication path in a multidrop communication form while the first traffic 200 does not pass through the working communication path 101-103-104-105-102, that is, while the first traffic 201 passes through the backup communication path 101-106-107-108-102. Here, the packet receiving section 1-2 receives a packet from the adjacent backup node 107, the packet transmitting section 3-1 transmits the packet to the adjacent switching node 101, and the packet transmitting section 3-2 transmits a packet to the adjacent backup node 107. The packet receiving section 1-1 for receiving a packet from the adjacent switching node 101 is omitted for the sake of simplifying the drawing.

The node 106 has a function of transmitting an instruction signal 91 representing bandwidth control information from a bandwidth control part 12a included in the packet receiving section 1-2 to the packet input section 2-1 for receiving the second traffic. This is a different point between configurations shown in FIGS. 7 and 9. A bandwidth control part 22a included in the packet input section 2-1 receives the instruction signal 91 representing the bandwidth control information from the bandwidth control part 12a, performs bandwidth control upon the received second traffic 202 on the basis of the bandwidth control information, and transmits the bandwidth-controlled second traffic 202 to the packet transmitting section 3-2 while the first traffic 201 passes through the backup communication path.

The bandwidth control part 22a performs the bandwidth control processing, for example, in such a manner that it decreases the bandwidth of the second traffic 202 so that the bandwidth thereof can fall within a bandwidth specified by the bandwidth control part 12a included in the packet receiving section 1-2 or in such a manner that it changes the priority information of the received second traffic 202 to priority information specified by the bandwidth control part 12a included in the packet receiving section 1-2. The bandwidth control part 22a may not receive the bandwidth control information from the packet receiving section 1-2. The packet input section 2-1 may be configured to retain the bandwidth control information.

According to the above-described configuration, even if a failure occurs in the working communication path and the first traffic 201 therefore passes through the backup communication path, the second traffic 202 can pass through the backup communication path after being bandwidth-controlled by using the available bandwidth of the backup communication path. Sections and parts other than the above-described sections and parts are the same as those described with reference to FIG. 7, and the detailed description thereof will be omitted.

Next, FIG. 10 shows an exemplary configuration and packet flow of the backup node 108 in the same case shown in FIG. 9 in which the second traffic 202 is caused to pass through the communication path 106-107-108 included in the backup communication path in the multidrop communication form while the first traffic 200 does not pass through the working communication path 101-103-104-105-102, that is, while the first traffic 201 passes through the backup communication path 101-106-107-108-102 as shown in FIG. 5. Here, the packet receiving section 1-1 receives a packet from the adjacent backup node 107 on the left side of the backup node 108, and the packet transmitting section 3-2 transmits the packet to the adjacent switching node 102 on the right side of the backup node 108. The packet receiving section 1-2 for receiving a packet from the adjacent switching node 102 on the right side of the backup node 108 and the packet transmitting section 3-1 for transmitting the packet to the adjacent backup node 107 on the left side of the backup node 108 are omitted for the sake of simplifying the drawing.

A bandwidth control part 42 is disposed in a packet output section 4-1. This is a different point between configurations shown in FIGS. 8 and 10. The bandwidth control part 42 controls the bandwidth of the second traffic 202 input into the packet output section 4-1 on the basis of an instruction signal 91a transmitted from the bandwidth control part 12a included in the packet receiving section 1-1, and transmits the bandwidth-controlled second traffic 202 out of the node 108.

The bandwidth control processing is performed by the bandwidth control part 42 in such a manner that the priority information, which has been changed by the bandwidth control part 22a included in the packet input section 2-1 for receiving the second traffic 202 in the backup node 106 shown in FIG. 9, is inversely changed to the original priority information. Sections and parts other than the above-described sections and parts are the same as those described with reference to FIG. 8, and the detailed description thereof will be omitted.

Thus, according to the configurations of the backup nodes 106 and 108 shown in FIGS. 9 and 10, even if the first traffic 201 passes through the backup communication path, the second traffic 202 different from the first traffic can be caused to pass through the backup communication path by using the available bandwidth of the backup communication path.

Figure 11:
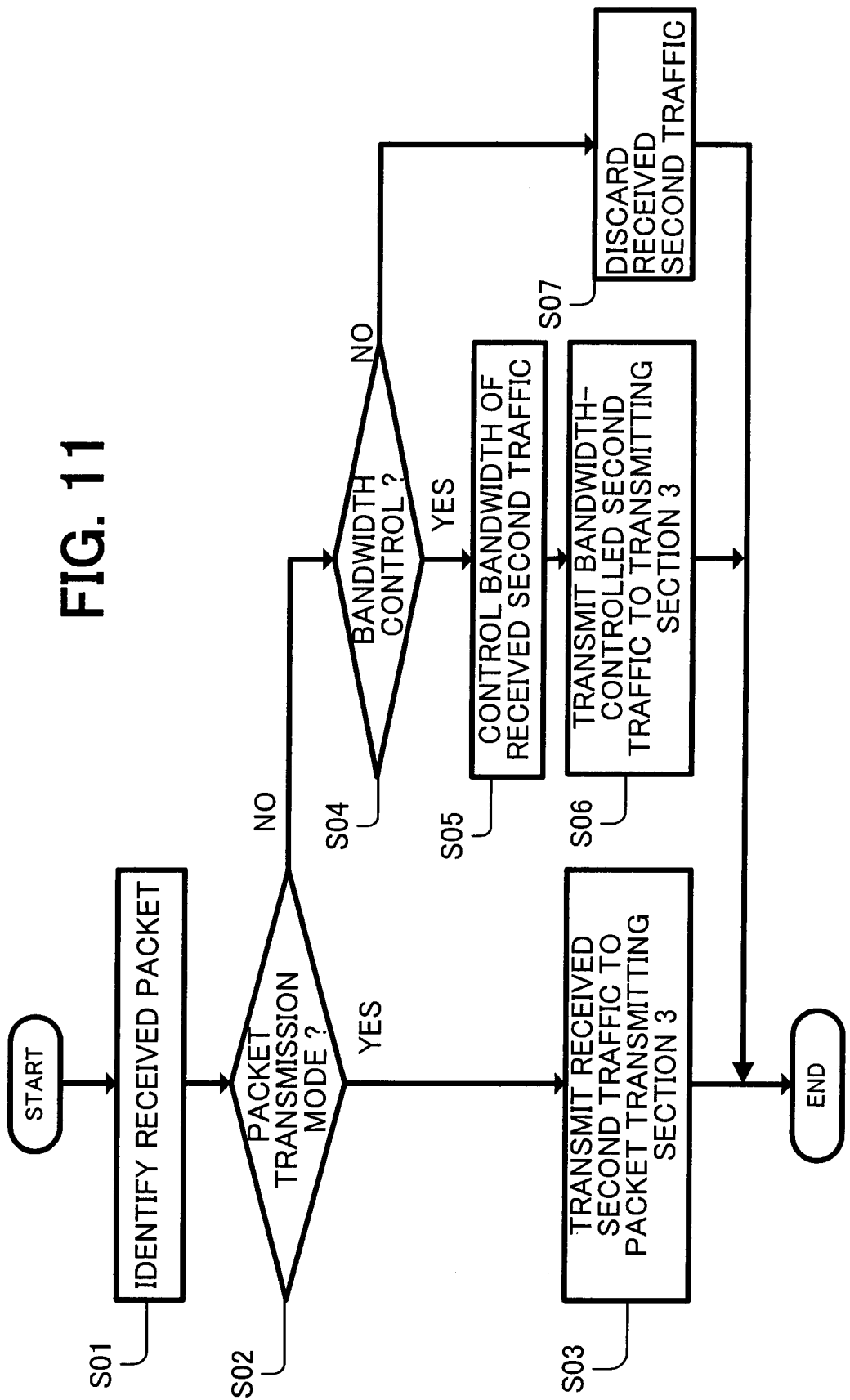
FIG. 11 is a flowchart showing an operation of a packet input section for receiving the second traffic according to an embodiment of the present invention.

FIG. 11 is a flowchart showing the operation of a packet input section according to an embodiment of the present invention. This operation corresponds to the combination of the first and second embodiments. That is, the operational flows of the packet input section 2-1 shown in FIGS. 7 and 9 are collectively shown in FIG. 11.

In step S01, a received packet is identified. For example, if a network is an Ethernet network, this identification is performed on the basis of VLAN tag information included in the header portion of the packet.

In step S02, packet processing mode information retained by the bandwidth control part 22 or 22a included in the packet input section 2-1 is determined. If the packet processing mode information indicates packet transmission mode (YES), the process proceeds to step S03. If the packet processing mode information does not indicate the packet transmission mode (NO), that is, if the packet processing mode indicates packet blocking mode, the process proceeds to step S04.

In step S03, the received second traffic 202 is transmitted to the packet transmitting section 3-2 on the basis of the result of determination performed in step S01, and then the process ends.

In step S04, whether there is bandwidth control information set in the bandwidth control part 22a included in the packet input section 2-1 is determined. If the bandwidth control information exists (YES), the process proceeds to step S05. If no bandwidth control information exists (NO), the process proceeds to step S07.

In step S05, the bandwidth control part 22a included in the packet input section 2-1 controls the bandwidth of the received second traffic 202. Here, the bandwidth control processing is performed on the basis of the bandwidth control information retained by the bandwidth control part 22a. The bandwidth control information includes the type of bandwidth control (bandwidth decrease, priority control, etc.). In addition, if the type of bandwidth control is the bandwidth decrease, the bandwidth control information includes an applicable bandwidth. If the type of bandwidth control is the priority control, the bandwidth control information includes priority information to which the current priority information should be changed. For example, if the type of bandwidth control is the bandwidth decrease, the bandwidth of the second traffic 202 is decreased so that the bandwidth thereof can be equal to or less than a specified bandwidth. If the type of bandwidth control is the priority control, priority information included in the received second traffic 202 is converted into a specified value.

The bandwidth control information may be retained in the bandwidth control part 22a in advance, or may be received from the bandwidth control part 12a included in the packet receiving section 1-2 via the instruction signal 91 and be retained in the bandwidth control part 22a included in the packet input section 2-1.

In step S06, the second traffic 202 that has been bandwidth-controlled in step S05 is transmitted to the packet transmitting section 3-2 on the basis of the result of the identification performed in step S01, and then the process ends.

In step S07, the received second traffic 202 is removed, and then the process ends.

In the above-described operational flow, in the case of the first embodiment, steps S04 to S06 are not required. If it is determined that the packet processing mode does not indicate the packet transmission mode (NO) in step S02, the process proceeds to step S07 in which the second traffic 202 is removed, and then the process ends. In the case of the second embodiment, all the processing steps are required.

Figure 12:
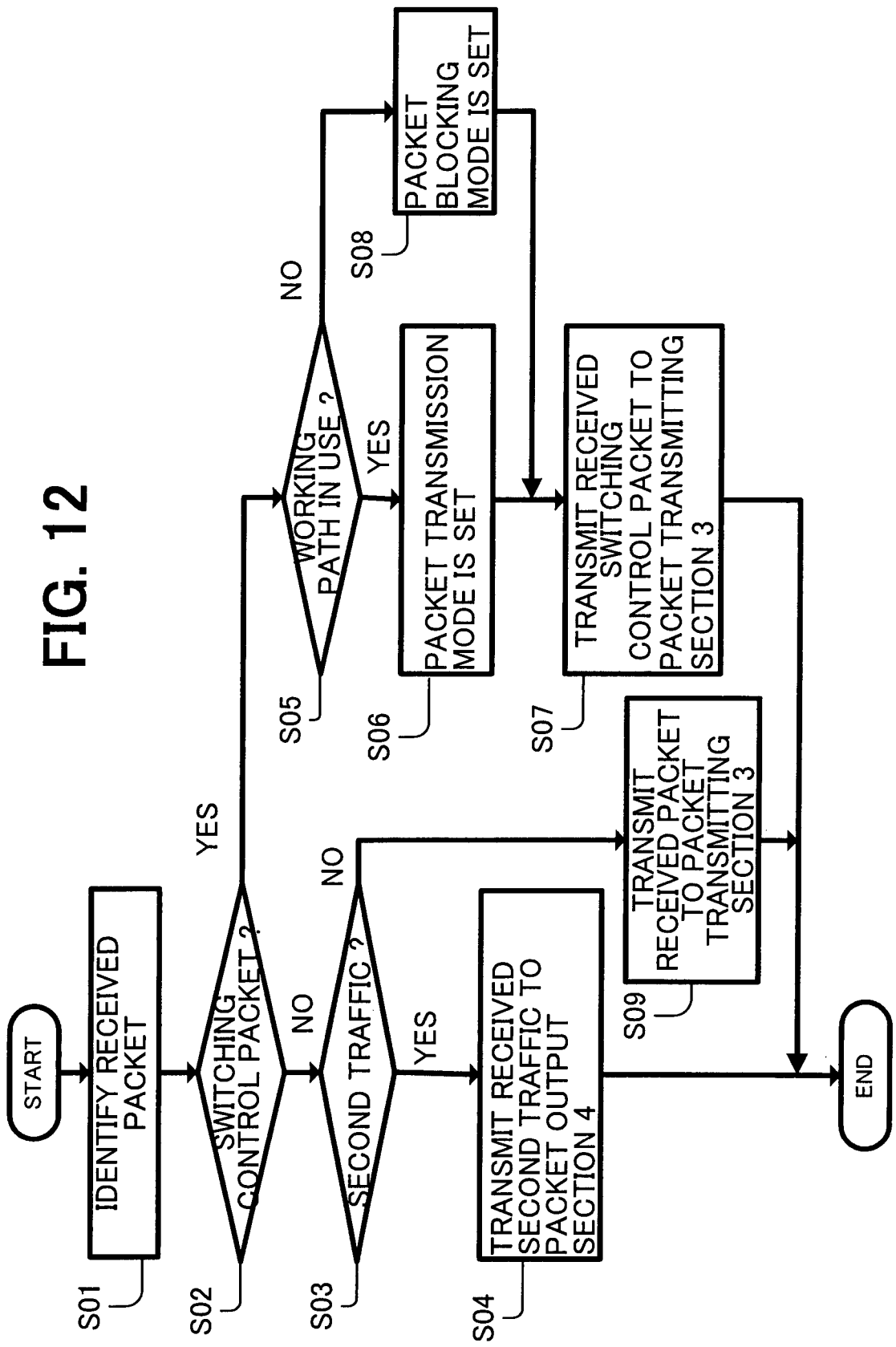
FIG. 12 is a flowchart showing an operation of a packet receiving section according to an embodiment of the present invention.

FIG. 12 is a flowchart showing the operation of a packet receiving section according to an embodiment of the present invention. This operation corresponds to the combination of the first and second embodiments. That is, the operational flows of the packet receiving section 1-2 included in the node 106 shown in FIGS. 7 and 9 and the packet receiving section 1-1 included in the node 108 shown in FIGS. 8 and 10 are collectively shown in FIG. 12.

In step S01, a packet is received from an adjacent node and is then identified to determine an interface to which the packet should be transmitted. That is, whether the packet should be transmitted to the packet transmitting section or packet output section is determined. For example, if the network is an Ethernet network, Type information or VLAN tag information included in the header portion of a packet is identified. Whether the received packet is an APS packet functioning as the switching control packet 203 can be identified using the Type information. Whether the received packet is the second traffic 202 can be identified using the VLAN tag information.

In step S02, whether the received packet is the switching control packet 203 is determined. If the received packet is the switching control packet 203 (YES), the process proceeds to step S05. If the received packet is not the switching control packet 203 (NO), the process proceeds to step S03.

In step S03, whether the received packet is the second traffic 202 is determined on the basis of the result of the identification performed in step S01. If the received packet is the second traffic 202 (YES), the process proceeds to step S04. If the received packet is not the second traffic 202 (NO), the process proceeds to step S09.

In step S04, the received second traffic 202 is transmitted to the packet output section 4-1 on the basis of the result of the identification performed in step S01, and then the process ends.

In step S05, working communication path identification information included in the switching control packet 203 is determined. If the first traffic 201 passes through the working communication path (YES), the process proceeds to step S06. If the first traffic 201 does not pass through the working communication path (NO), the process proceeds to step S08.

In step S06, the control packet determining part 13 sets the packet transmission mode for the bandwidth control part 22 or 22a included in the packet input section 2-1 for receiving the second traffic.

In step S07, the received switching control packet 203 is transmitted to the packet transmitting section 3-1 or 3-2 on the basis of the result of the identification performed in step S01, and then the process ends.

In step S08, the control packet determining part 13 sets the packet blocking mode for the bandwidth control part 22 or 22a included in the packet input section 2-1 for receiving the second traffic, and the process proceeds to step S07.

In step S09, the received first traffic 201 is transmitted to the packet transmitting section 3-1 on the basis of the result of the identification performed in step S01, and then the process ends.

In the second embodiment of the present invention, the bandwidth control part 12a included in the packet receiving section 1 transmits bandwidth control information to the packet input section 2-1 for receiving the second traffic. This is different from the first embodiment. However, this different point is not shown in the above-described operational flow, because the above-described operational flow is related to an operational flow at the time of packet receiving. Accordingly, the above-described operational flow at the time of packet receiving is common for the first and second embodiments of the present invention.

Figure 13:
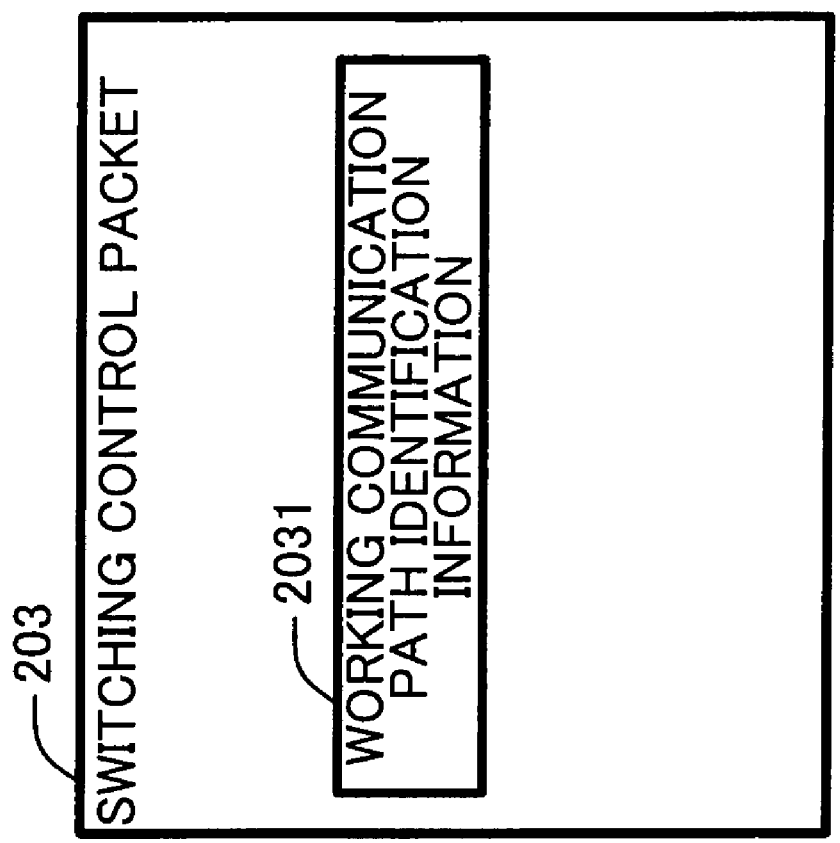
FIG. 13 is a diagram showing an exemplary configuration of a switching control packet according to an embodiment of the present invention.

FIG. 13 is an exemplary configuration of a switching control packet according to an embodiment of the present invention. The switching control packet 203 includes working communication path identification information 2031 that is flag information used to determine whether the first traffic 200 passes through the working communication path.

The switching control packet 203 is periodically transmitted via the backup communication path between the switching nodes 101 and 102 which are used to perform switching between communication paths in a 1:1 redundant configuration. Each node included in the backup communication path can know the condition of the working communication path by checking the switching control packet 203.

For example, if the network is an Ethernet network, an APS packet is used for the switching control packet 203.

Figure 14:
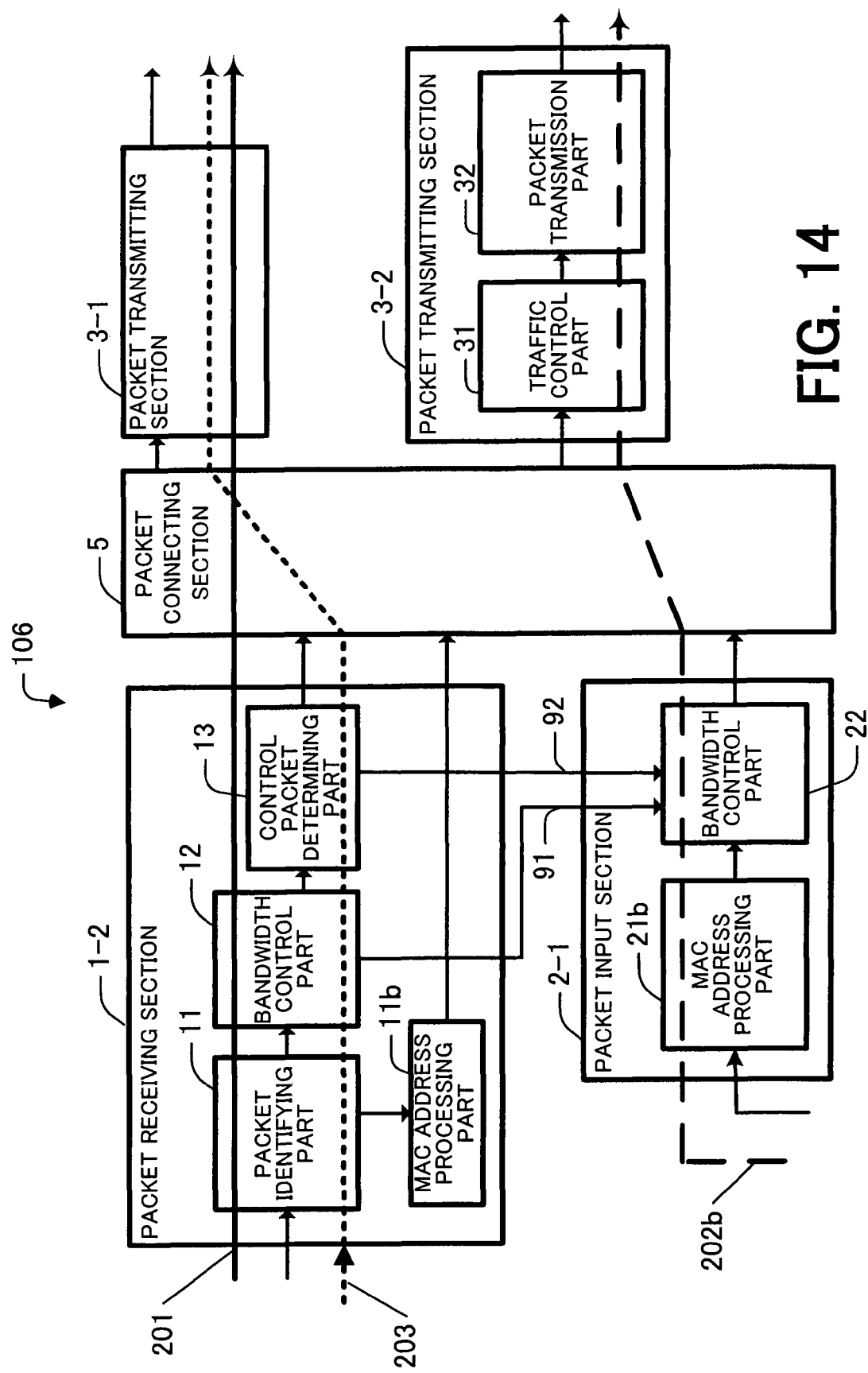
FIG. 14 is a diagram showing an exemplary node configuration and packet flow (1) according to a third embodiment of the present invention.
Figure 15:
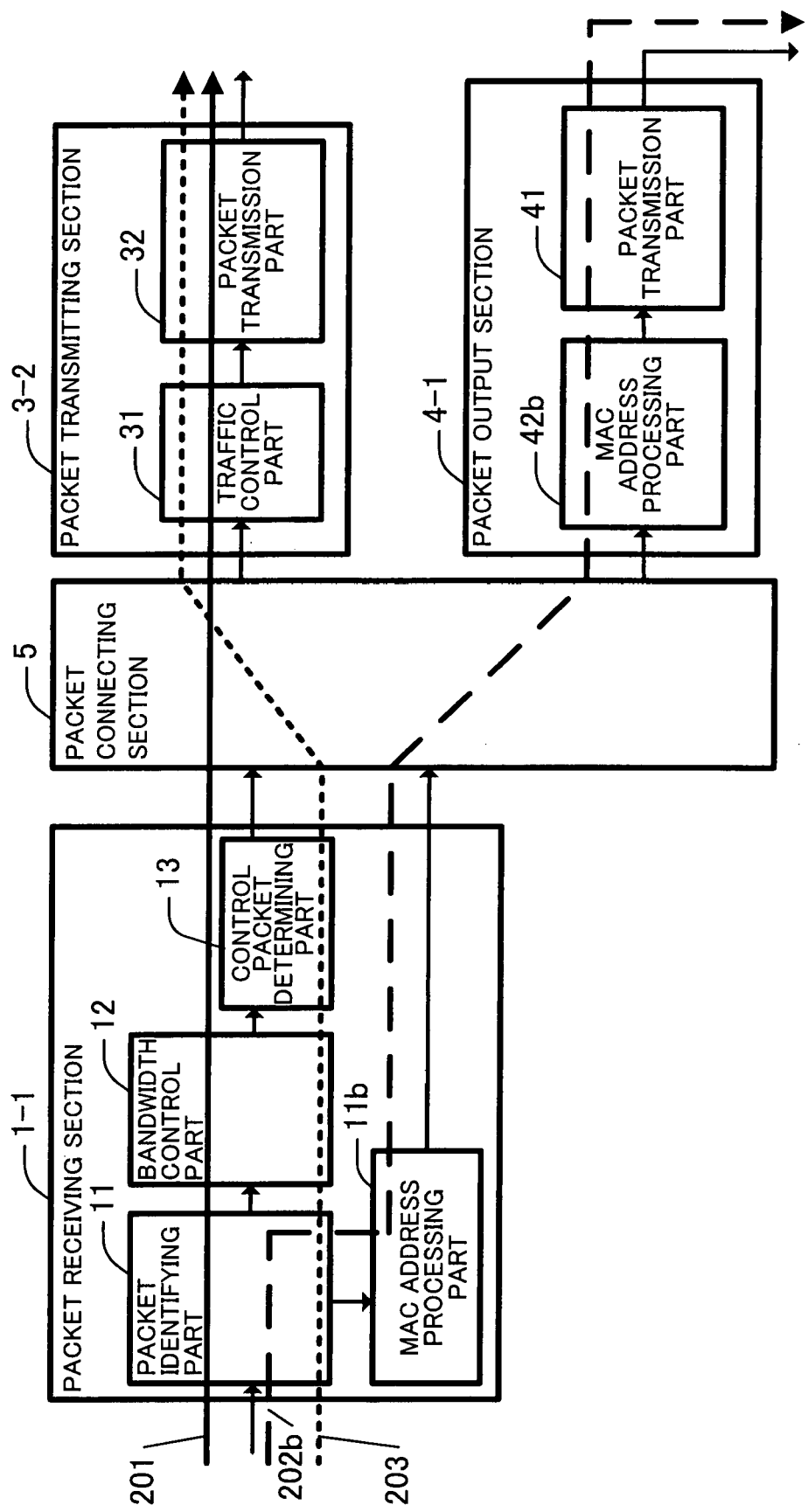
FIG. 15 is a diagram showing an exemplary node configuration and packet flow (2) according to the third embodiment of the present invention.

FIGS. 14 and 15 show node configurations and packet flows according to a third embodiment of the present invention. Here, it is assumed that the network is an Ethernet network. FIG. 14 shows an exemplary node configuration and packet flow of the backup node 106 included in the network shown in FIG. 3. FIG. 15 shows an exemplary node configuration and packet flow of the backup node 108 included in the network shown in FIG. 3. The packet receiving section 1-2, the packet input section 2-1 for receiving the second traffic, and the packet output section 4-1 are individually provided with a MAC address processing part. This is different from the second embodiment shown in FIGS. 9 and 10. If a VLAN tag is not included in the header portion of the received packet, the destination of the received packet (that is, an interface to which the packet is transmitted) is determined on the basis of a MAC address. Consequently, second traffic 202b having no VLAN tag can be caused to pass through the backup communication path.

In FIG. 14, the second traffic 202b having no VLAN tag is input into the packet input section 2-1 for receiving the second traffic. Subsequently, a MAC address processing part 21b determines the destination of the second traffic 202b on the basis of its MAC address, and then transmits the second traffic 202b to the packet transmitting section 3-2 via the packet connecting section 5.

In FIG. 15, the second traffic 202b is received by the packet receiving section 1-1. If the packet identifying part 11 determines that the second traffic 202b has no VLAN tag, the second traffic 202b is transmitted to a MAC address processing part 11b. The MAC address processing part 11b transmits the second traffic 202b to the packet output section 4-1 via the packet connecting section 5 on the basis of a MAC address included in the header portion of the second traffic 202b. A packet having a VLAN tag (the first traffic 201 and the switching control packet 203) is processed as shown in FIGS. 9 and 10. Configurations of the control packet determining part 13 and the bandwidth control part 12 which are included in the packet receiving section 1-2, the bandwidth control part 22 included in the packet input section 2-1 for receiving the second traffic, the packet transmitting section 3-2, and the packet transmission part 41 included in the packet output section 4-1 are the same as those described with reference to FIGS. 9 and 10, and the detailed description thereof will therefore be omitted.

Figure 16:
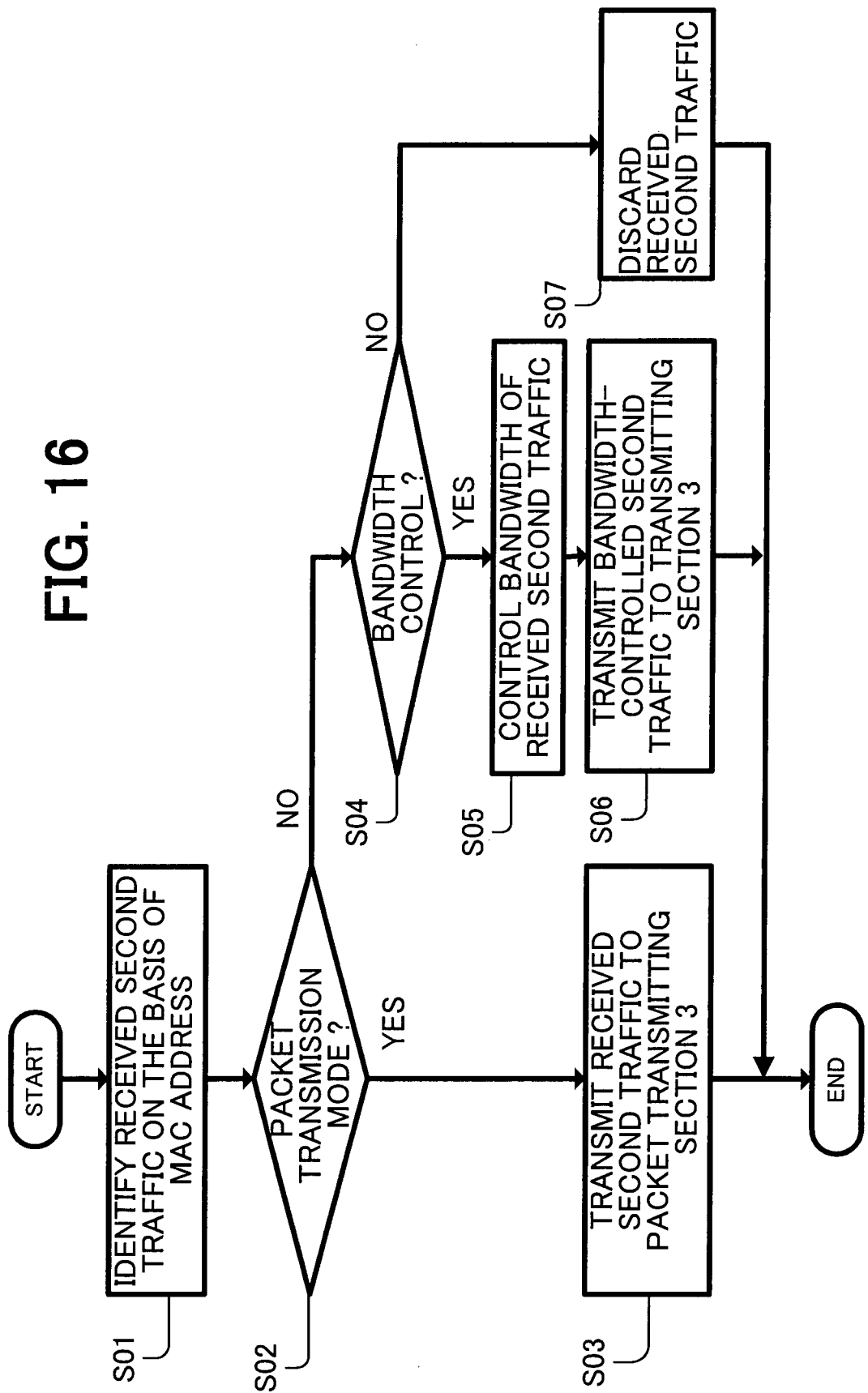
FIG. 16 is a diagram showing an operational flow (1) according to the third embodiment of the present invention.
Figure 17:
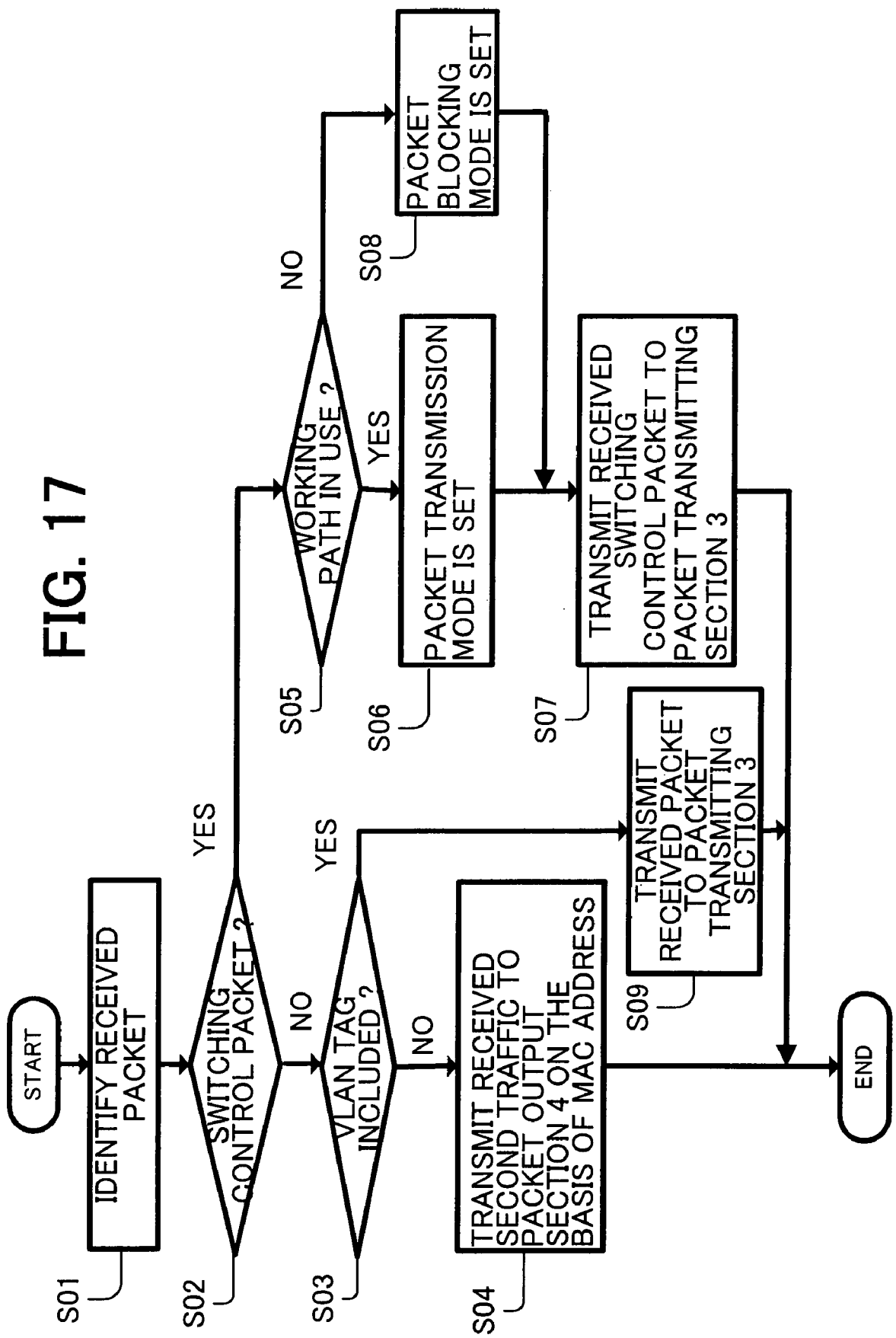
FIG. 17 is a diagram showing an operational flow (2) according to the third embodiment of the present invention.

FIGS. 16 and 17 are operational flows according to the third embodiment of the present invention. First, FIG. 16 shows the operational flow of the packet input section 2-1 for receiving the second traffic according to the third embodiment. Here, in step S01, a received packet is identified on the basis of its MAC address. This is only one different point between this operational flow and the operational flow according to the second embodiment shown in FIG. 11. Other processing is the same as that shown in FIG. 11, and the detailed description thereof will be omitted.

FIG. 17 shows the operational flow of a packet receiving section according to the third embodiment of the present invention.

Differences between this operational flow and the operational flow of the packet receiving section according to the second embodiment shown in FIG. 12 are step S03 and step S04. That is, first, in step S03, whether a received packet is the second traffic 202b is determined by determining the existence of a VLAN tag in the received packet. If the received packet is the second traffic 202b, that is, if the received packet has no VLAN tag (NO), switching of the received packet is performed on the basis of its MAC address to transmit the received packet to the packet output section 4-1 in step S04. Other processing is the same as that of the operational flow of FIG. 12, and the detailed description thereof will be omitted.

According to the third embodiment, the second traffic 202b can be input/output into/from the backup communication path without using a VLAN.

Figure 18:
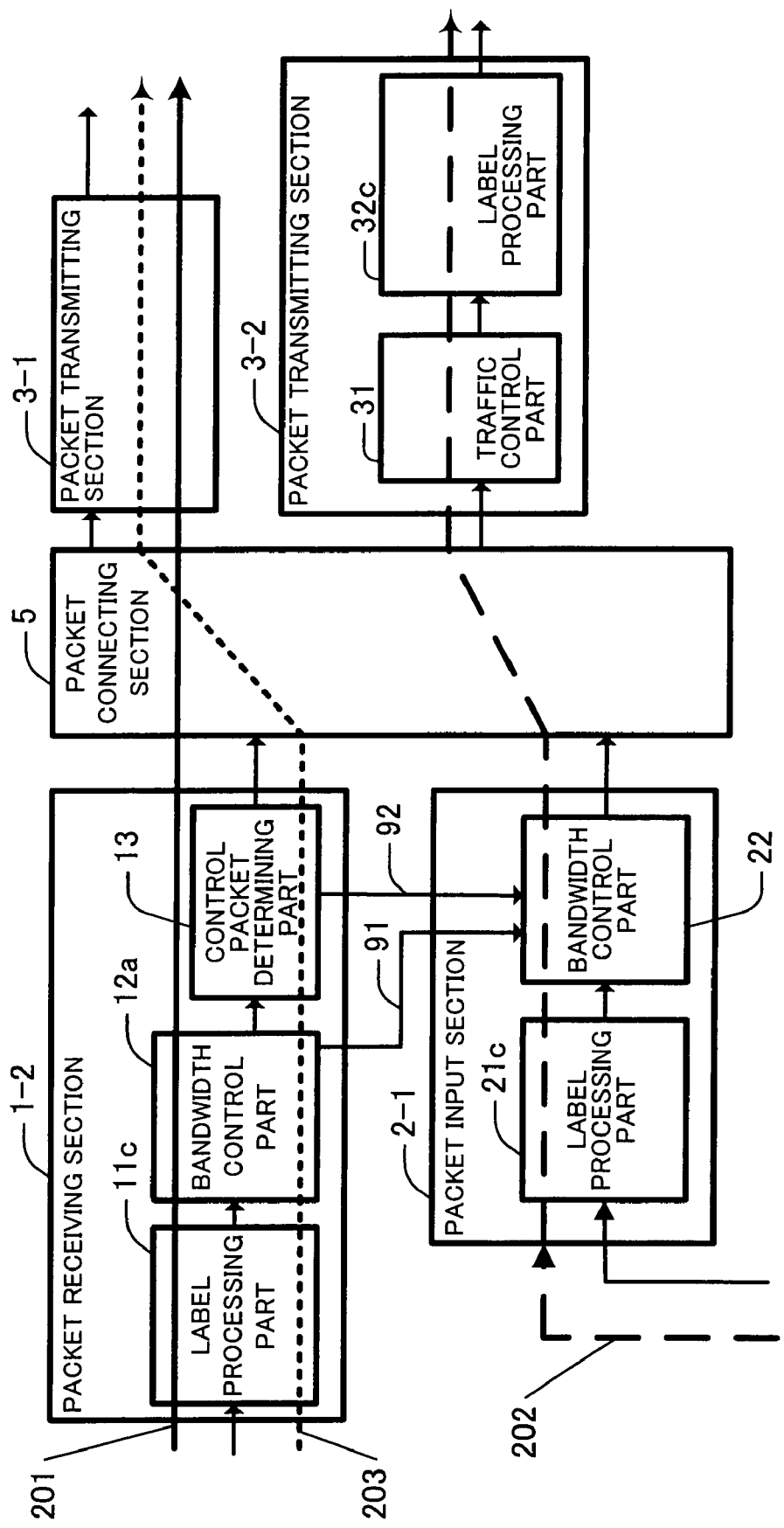
FIG. 18 is a diagram showing an exemplary node configuration and packet flow (1) according to a fourth embodiment of the present invention.
Figure 19:
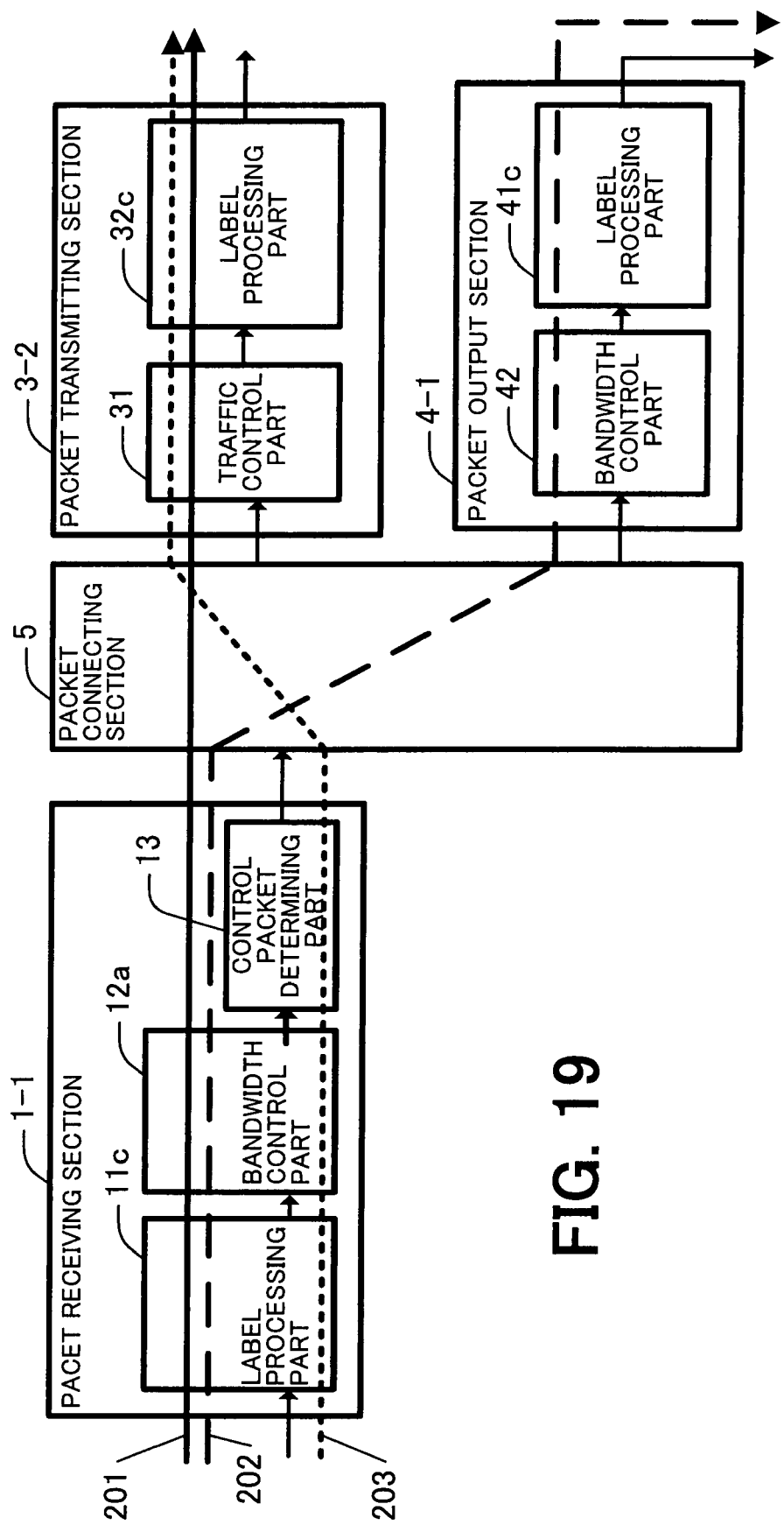
FIG. 19 is a diagram showing an exemplary node configuration and packet flow (2) according to the fourth embodiment of the present invention.

FIGS. 18 and 19 show node configurations and packet flows according to a fourth embodiment of the present invention in a label switching network. FIG. 18 shows an exemplary node configuration and packet flow of the backup node 106 shown in FIG. 3. FIG. 19 shows an exemplary node configuration and packet flow of the backup node 108 shown in FIG. 3.

The packet identifying part 11 included in the packet receiving section 1-2, the packet identifying part 21 included in the packet output section 2-1 for receiving the second traffic, and the packet transmission part 32 included in the packet transmitting section 3-2, which are shown in the exemplary node configurations according to the second embodiment in FIGS. 9 and 10, are replaced by a label processing part 11c, a label processing part 21c, and a label processing part 32c, respectively. In the label switching network, switching of a packet is performed by identifying label information extracted from a received packet. Priority control can be achieved by controlling an EXP bit included in the label information. Sections and parts other than the above-described sections and parts are the same as those described with reference to FIGS. 9 and 10, and the detailed description thereof will be omitted.

Figure 20:
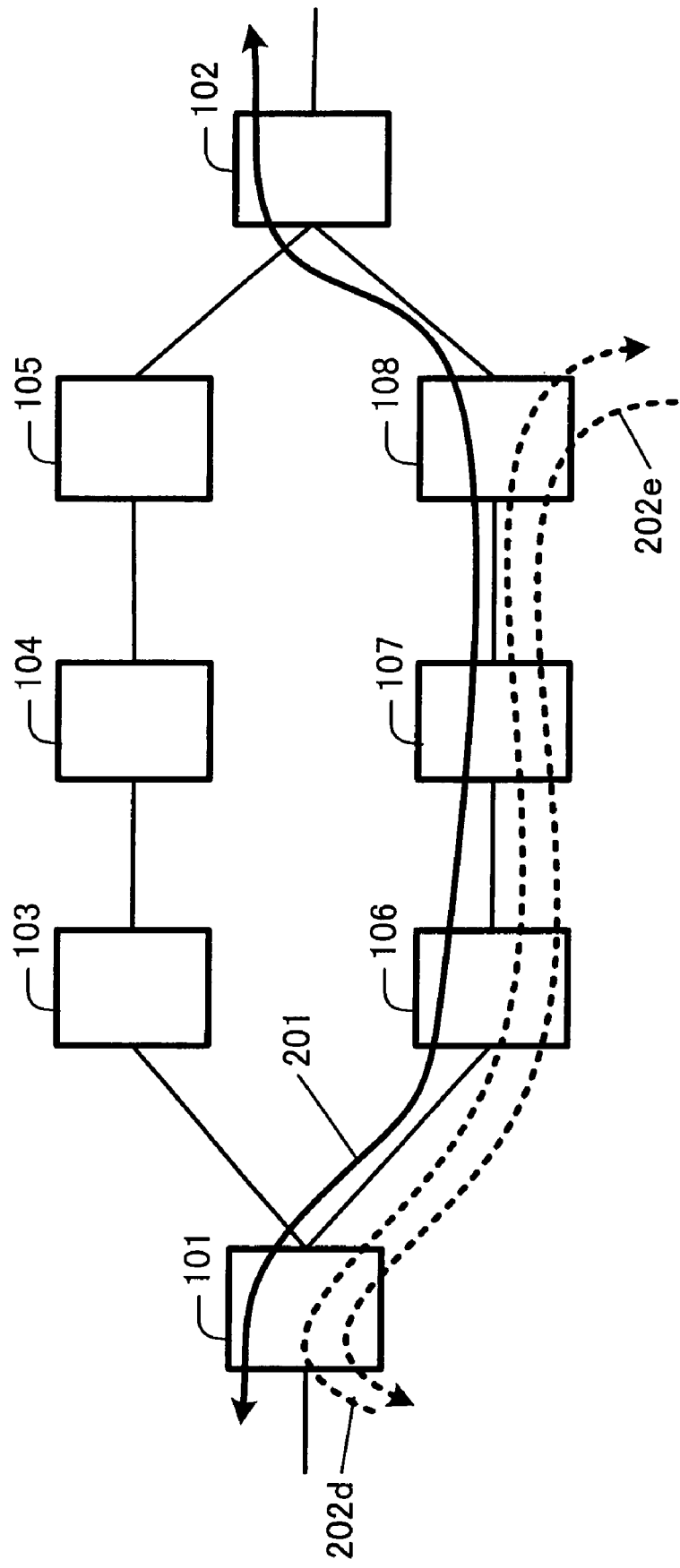
FIG. 20 is a diagram showing a packet flow in an exemplary expanded configuration according to the second embodiment of the present invention.

FIG. 20 shows a packet flow in an exemplary expanded configuration according to the second embodiment of the present invention. In the packet flow according to the second embodiment shown in FIG. 5, the second traffic 202 passes through the closed communication path 106-107-108 included in the backup communication path. However, in the exemplary expanded configuration according to the second embodiment shown in FIG. 20, the second traffic 202 can also pass through a communication path between the switching node 101 or 102, which is used to perform switching between the backup and working communication paths, and the backup node 106, 107, or 108 included in the backup communication path. Here, a case is illustrated in which second traffic 202d and 202e pass through a communication path between the switching node 101 and the backup node 108 included in the backup communication path.

Figure 21:
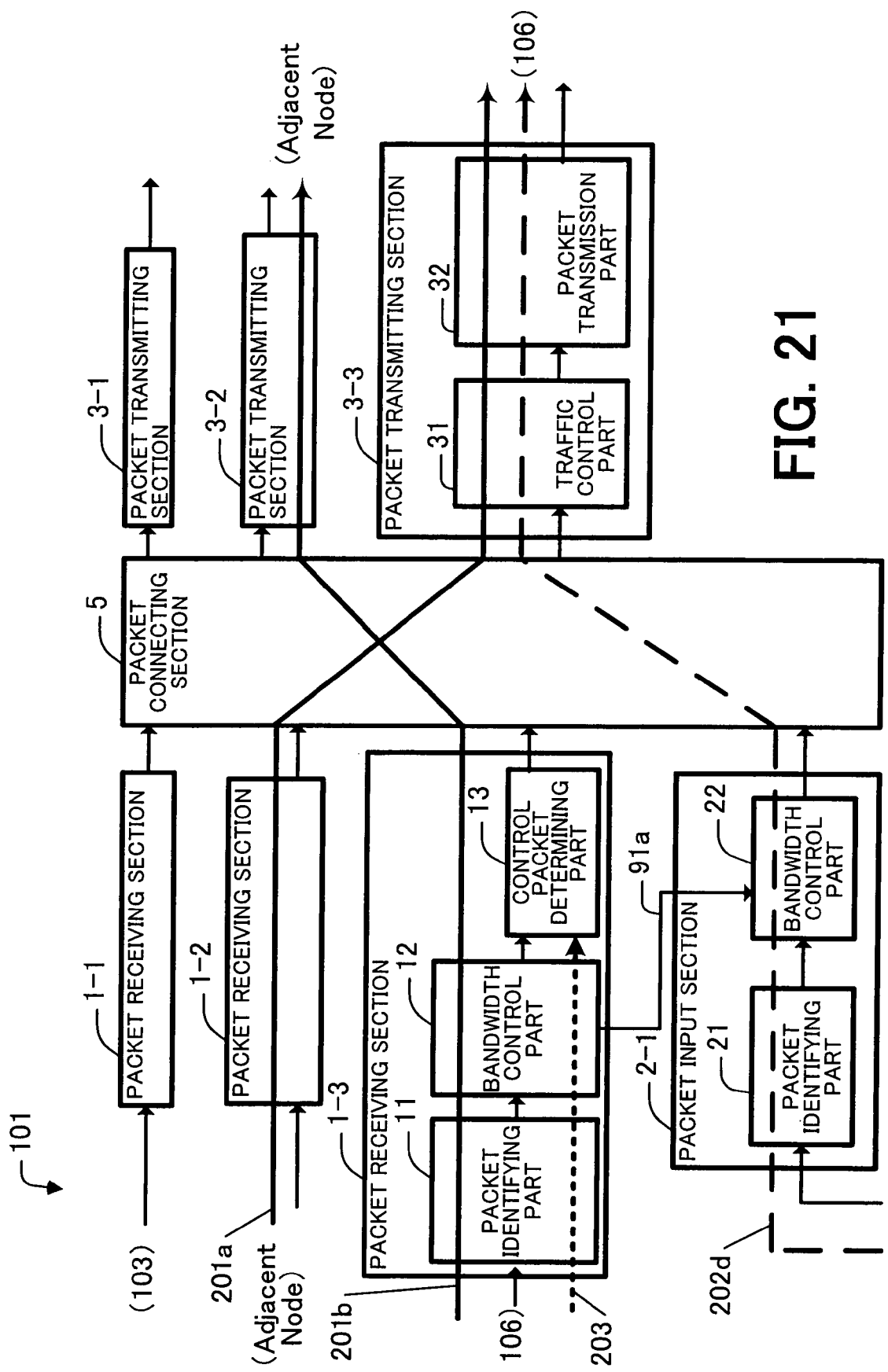
FIG. 21 is a diagram showing a node configuration and packet flow (1) in an exemplary expanded configuration according to the second embodiment of the present invention.
Figure 22:
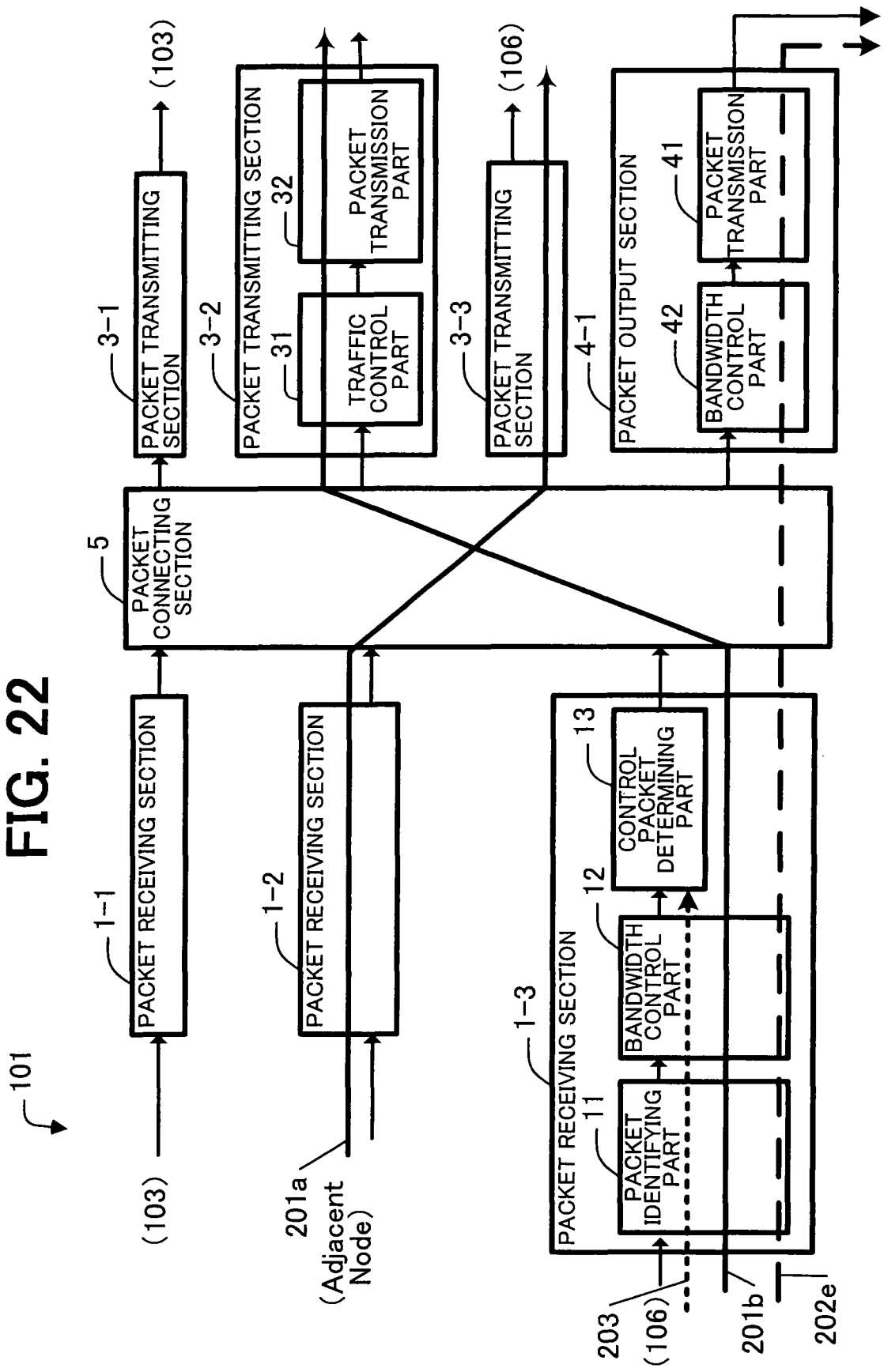
FIG. 22 is a diagram showing a node configuration and packet flow (2) in an exemplary expanded configuration according to the second embodiment of the present invention.

FIGS. 21 and 22 show node configurations and packet flows in an exemplary expanded configuration according to the second embodiment of the present invention. First, FIG. 21 shows an exemplary configuration and packet flow of the switching node 101 when the second traffic 202d is input into the switching node 101 shown in FIG. 20.

In FIG. 21, the packet receiving section 1-1 and the packet transmitting section 3-1 are connected to the adjacent node 103 included in the working communication path, the packet receiving section 1-2 and the packet transmitting section 3-2 are connected to an adjacent node (not shown) on the left side of the switching node 101 shown in FIG. 20, and a packet receiving section 1-3 and a packet transmitting section 3-3 are connected to the adjacent backup node 106 included in the backup communication path.

In FIG. 21, the packet input section 2-1 for receiving the second traffic is disposed in the switching node 101. The second traffic 202d is input into the packet input section 2-1 for receiving the second traffic, and is then fed to the communication path 106-107-108 included in the backup communication path via the packet transmitting section 3-3. On the other hand, first traffic 201a and 201b flow in parallel with the second traffic 202. Here, the first traffic 201 is represented by the first traffic 201a and 201b corresponding to transmission directions thereof.

The second traffic 202d input into the packet input section 2-1 included in the switching node 101 is bandwidth-controlled by the bandwidth control part 22, and is then fed to the communication path 106-107-108 included in the backup communication path via the packet transmitting section 3-3 along with the first traffic 201a. The bandwidth control part 22 included in the packet input section 2-1 for receiving the second traffic performs bandwidth control on the basis of specified bandwidth control information. The bandwidth control information may be a bandwidth used for bandwidth decrease, or a conversion value of priority information included in the second traffic 202d. This bandwidth control information may be stored in advance in the bandwidth control part 22, or may be set in accordance with an instruction 91a transmitted from the bandwidth control part 12 included in the packet receiving section 1-3 as shown in FIG. 21. The configuration of the backup node 108 from which the second traffic 202d is output is the same as that shown in FIG. 10, and the detailed description thereof will be omitted.

Next, FIG. 22 shows an exemplary configuration and packet flow of the switching node 101 when the second traffic 202e transmitted through the communication path 106-107-108 included in the backup communication path is output from the switching node 101.

In FIG. 22, the packet output section 4-1 is disposed in the switching node 101. The packet receiving section 1-3 receives the second traffic 202e transmitted through the backup communication path. The received second traffic 202e is identified by the packet identifying part 11, and is then transmitted to the packet output section 4-1. After priority control information included in the second traffic 202e has been restored by the bandwidth control part 42 included in the packet output section 4-1, the second traffic 202e is output from the packet transmission part 41. On the other hand, the first traffic 201a and 201b pass through the backup communication path in parallel with the second traffic 202. Here, the first traffic 202 is represented by the first traffic 201a and 201b corresponding to transmission directions thereof.

Thus, by applying the node configuration according to the second embodiment to the switching nodes for performing switching between the working and backup communication paths, the second traffic 202d and 202e, which are different from the bandwidth-controlled first traffic, can pass through a communication path between the switching node (the switching node 101 or 102 in an exemplary network shown in FIG. 20) and the backup node 106, 107, or 108 included in the backup communication path while the first traffic 201a and 201b pass through the backup communication path.

What is claimed is:

1. A packet communication method for transmitting an extra traffic in redundant communication between nodes in a network, comprising:
   selecting, by two switching nodes, one of a working communication path connecting the two switching nodes via nodes, and a backup communication path connecting the two switching nodes via backup nodes, the backup nodes designating nodes other than the two switching nodes;
   transmitting, by the two switching nodes, a first traffic between the two switching nodes via the selected communication path;
   transmitting, by the two switching nodes, a switching control packet between the two switching nodes via the backup communication path, the switching control packet including working communication path identification information representing whether the first traffic passes through the working communication path;
   determining, by the two switching nodes, the working communication path as a communication path through which the first traffic passes when the working communication path operates under normal conditions;
   determining, by the two switching nodes, the backup communication path as a communication path through which the first traffic passes when a failure has occurred in the working communication path;
   providing one of the backup nodes with an input port that is not included in the backup communication path, the input port holding packet processing mode information, wherein the input port changes processing on a second traffic different from the first traffic based on the packet processing mode information;
   setting, by the one of the backup nodes, a packet transmission mode to the packet processing mode information when the first traffic is passing through the working communication path;
   setting, by the one of the backup nodes, a packet blocking mode to the packet processing mode information when the first traffic is not passing through the working communication path;
   performing, by the backup nodes, a second traffic transmission procedure when the packet processing mode information held by the input port indicates the packet transmission mode, the second traffic transmission procedure comprising:
      receiving, by the input port, the second traffic from outside the backup communication path;
      transmitting, by the input port, the received second traffic to at least one other backup node via the backup communication path; and
      transmitting, by the at least one other backup node, the second traffic to outside the backup communication path via an output port that is provided for the at least one other backup node and not included in the backup communication path; and
   discarding, by the input port, the second traffic received from outside the backup communication path via the input port when the packet processing mode information indicates the packet blocking mode.

2. The packet communication method according to claim 1, wherein
   when the packet processing mode information indicates the packet blocking mode, the input port controls a bandwidth of the received second traffic, and transmits the bandwidth-controlled second traffic to the at least one other backup node via the backup communication path.

3. The packet communication method according to claim 2, wherein
   the bandwidth of the second traffic received by the input port is decreased, so that the decreased bandwidth of the second traffic is equal to or less than a predetermined bandwidth.

4. The packet communication method according to claim 2, wherein
   the input port controls a bandwidth of the received second traffic in such a manner that priority control information included in the second traffic is converted into a predetermined value.

5. The packet communication method according to claim 1, wherein
   the network is an Ethernet network, and the input port performs identification and transmission of the second traffic based on VLAN tag information.

6. The packet communication method according to claim 1, wherein
   the network is an Ethernet network, and the input port performs identification and
   transmission of the second traffic based on MAC address information.

7. The packet communication method according to claim 1, wherein
   the network is an MPLS network, and the input port performs identification and transmission of the second traffic based on label information.

8. The packet communication method according to claim 2, wherein the two switching nodes determine whether the first traffic passes through the working communication path based on the working communication path identification information included in the switching control packet, and wherein, when the first traffic does not pass through the working communication path, a second input port provided for one of the two switching nodes receives the second traffic, controls the bandwidth of the received second traffic, and transmits the bandwidth-controlled second traffic to at least one backup node.

9. A packet communication device in a network in which one of a working communication path connecting two switching nodes via nodes, and a backup communication path connecting the two switching nodes via backup nodes is selected, and a packet is transmitted between the two switching nodes via the selected communication path, the packet communication device being one of the backup nodes, that is, one of nodes other than the switching nodes included in the backup communication path, the packet communication device comprising:

a packet receiving section to receive a switching control packet that is transmitted between the two switching nodes via the backup communication path and includes working communication path identification information used to determine whether first traffic passes through the working communication path, and to determine details of the working communication path identification information; and a packet input section
to hold packet processing mode information, wherein
the packet input section changes processing on a second traffic different from the first traffic based on the packet processing mode information,
the packet receiving section sets a packet transmission mode to the packet processing mode information when the first traffic is passing through the working communication path, and
the packet receiving section sets a packet blocking mode to the packet processing mode information when the first traffic is not passing through the working communication path, to receive the second traffic from outside the backup communication path,
to transmit the received second traffic to at least one other backup node included in the backup communication path via the backup communication path when the packet processing mode information indicates the packet transmission mode, and
to discard the received second traffic when the packet processing mode information indicates the packet blocking mode, so that the at least one other backup node transmits the received second traffic to outside the backup communication path via an output port that is provided for the at least one other backup node and not included in the backup communication path.

10. The packet communication device according to claim 9, wherein when the packet processing mode information indicates the packet blocking mode, the packet input section controls a bandwidth of the received second traffic and transmits the bandwidth-controlled second traffic to the at least one other backup node included in the backup communication path via the backup communication path.

11. The packet communication device according to claim 10, wherein the bandwidth of the second traffic is decreased so that the decreased bandwidth of the second traffic is equal to or less than a predetermined bandwidth.

12. The packet communication device according to claim 10, wherein the packet input section controls the bandwidth of the received second traffic in such a manner that priority control information included in the second traffic is converted into a predetermined value.

13. The packet communication device according to claim 9, wherein the network is an Ethernet network, and the packet input section performs identification and transmission of the second traffic based on VLAN tag information.

14. The packet communication device according to claim 9, wherein the network is an Ethernet network, and the packet input section performs identification and transmission of the second traffic based on MAC address information.

15. The packet communication device according to claim 9, wherein the network is an MPLS network, and packet input section performs identification and transmission of the second traffic based on label information.

16. A packet communication device in a network in which one of a working communication path connecting two switching nodes via nodes, and a backup communication path connecting the two switching nodes via backup nodes is selected, and a packet is transmitted between the two switching nodes via the selected communication path, the packet communication device being one of nodes included in the backup communication path, the packet communication device comprising:

a packet receiving section to receive a switching control packet that is transmitted between the two switching nodes via the backup communication path and includes working communication path identification information used to determine whether first traffic passes through the working communication path, and to determine details of the working communication path identification information; and a packet input section
to hold packet processing mode information, wherein
the packet input section changes processing on a second traffic different from the first traffic based on the packet processing mode information,
the packet receiving section sets a packet transmission mode to the packet processing mode information when the first traffic is passing through the working communication path, and
the packet receiving section sets a packet blocking mode to the packet processing mode information when the first traffic is not passing through the working communication path,
to receive the second traffic from outside the backup communication path, and
to transmit the bandwidth-controlled second traffic to at least one other node included in the backup communication path via the backup communication path when the packet processing mode information indicates the packet transmission mode, so that the at least one other node included along the backup communication path transmits the received bandwidth-controlled second traffic to outside the backup communication path via an output port that is provided for the at least one other node and not included in the backup communication path.

* * * * *